United States Patent
Miller

(10) Patent No.: US 8,468,211 B2
(45) Date of Patent: Jun. 18, 2013

(54) COMMUNICATION AND SYNCHRONIZATION IN A NETWORKED TIMEKEEPING ENVIRONMENT

(75) Inventor: Barrick H. Miller, Boulder Creek, CA (US)

(73) Assignee: Schlage Lock Company LLC, Carmel, IN (US)

( * ) Notice: Subject to any disclaimer, the term of this patent is extended or adjusted under 35 U.S.C. 154(b) by 832 days.

(21) Appl. No.: 12/290,350

(22) Filed: Oct. 30, 2008

(65) Prior Publication Data

US 2009/0157537 A1  Jun. 18, 2009

Related U.S. Application Data

(60) Provisional application No. 61/001,048, filed on Oct. 30, 2007.

(51) Int. Cl.
| | | |
|---|---|---|
| G06F 15/16 | (2006.01) | |
| G06F 7/00 | (2006.01) | |
| G06F 17/00 | (2006.01) | |

(52) U.S. Cl.
USPC .......................................... 709/208; 707/613

(58) Field of Classification Search
USPC ............... 705/32; 709/208, 212; 707/613, 707/614
See application file for complete search history.

(56) References Cited

U.S. PATENT DOCUMENTS

| | | | | |
|---|---|---|---|---|
| 5,522,077 | A * | 5/1996 | Cuthbert et al. ..................... | 1/1 |
| 6,295,541 | B1 * | 9/2001 | Bodnar et al. ....................... | 1/1 |
| 6,477,545 | B1 * | 11/2002 | LaRue ............................ | 707/625 |
| 6,764,013 | B2 | 7/2004 | Ben-Aissa | |
| 6,802,005 | B1 | 10/2004 | Berson | |
| 6,810,405 | B1 * | 10/2004 | LaRue et al. ................... | 707/613 |
| 7,203,344 | B2 | 4/2007 | McClurg et al. | |
| 7,229,013 | B2 | 6/2007 | Ben-Aissa | |
| 7,233,919 | B1 | 6/2007 | Braberg et al. | |
| 7,308,122 | B2 | 12/2007 | McClurg et al. | |
| 2002/0030582 | A1 | 3/2002 | Depp et al. | |
| 2002/0030584 | A1 | 3/2002 | Perler et al. | |
| 2003/0191700 | A1 | 10/2003 | Horne et al. | |
| 2004/0122752 | A1 | 6/2004 | Horne et al. | |
| 2005/0027559 | A1 * | 2/2005 | Rajan et al. ........................ | 705/1 |
| 2007/0094109 | A1 | 4/2007 | Perry | |
| 2008/0059599 | A1 * | 3/2008 | Chokshi et al. ............... | 709/212 |

* cited by examiner

Primary Examiner — Joseph Avellino
Assistant Examiner — Jeong S Park
(74) Attorney, Agent, or Firm — Michael Best & Friedrich LLP

(57) ABSTRACT

An optimized time and attendance system and methods. In some embodiments, a networked time and attendance system includes a network services server with a global database and a client device terminal with a local database. The device terminal is configured to create new time keeping records on the local database using information stored in the local database. The device terminal is further configured to initiate a connection to the host server and synchronize the local database with the global database. In some embodiments, the client terminal is configured to continue creating additional new time keeping records in the local database even when a connection to the host server is unavailable. In some embodiments, the client terminal includes a user interface, a local database, a first processor configured to control all system functions except for biometric data processing, and a second processor configured to capture and process biometric data.

19 Claims, 19 Drawing Sheets

COMMUNICATION AND SYNCHRONIZATION IN A NETWORKED TIMEKEEPING ENVIRONMENT

RELATED APPLICATIONS

The present application claims priority to U.S. Provisional Application No. 61/001,048 filed on Oct. 30, 2007, the entire contents of which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Embodiments of the invention relate generally to systems and methods for time-clocking and employee record keeping and, more specifically, to the use of biometric data in such systems and methods.

Employee time and attendance systems track the amount of time worked by an employee. In such systems, the employee "punches-in" upon beginning work and "punches-out" when finished. These systems, however, are susceptible to fraudulent "buddy punching," where a co-worker punches-in or punches-out for another employee. As such, the time-keeping records can be falsified and an employee may be credited for more work-hours than actually performed.

More recently, biometric technologies have been incorporated into time and attendance systems. In such systems, a person's identity can be verified by comparing a captured biometric such as a fingerprint, a handprint, facial features, or voice to a stored record of the same biometric.

SUMMARY OF THE INVENTION

Although time and attendance systems exist, there remains a need for systems and methods that more effectively incorporate biometric-based identification technologies and workforce time and attendance record-keeping. Among other things, the systems and methods disclosed herein provide for an electronic time and attendance system in which the timing and efficiency of user operation is not limited by externalities such as image acquisition/processing and network communications.

In some embodiments, a networked time and attendance system includes a host server and at least one client terminal. The host server includes a global database containing time keeping records and stored employee identification data. The client terminal includes a terminal user interface, a local database, and a first processor. The local database also contains time keeping records and stored employee identification data. The first processor is configured to receive input employee identification data from any employee through the terminal user interface, compare the input data to stored data from the local database, and create a new time keeping record in the local database if the input data matches the stored data. The first processor is also configured to initiate a connection to the host server and synchronize the local database with the global database.

In some embodiments, the client terminal in the networked time and attendance system is configured to continue operating even when the connection to the host server is unavailable. In some such situations, the client terminal continues to create new time keeping records in the local database using the employee identification data from the local database while the processor repeatedly attempts to initialize the connection to the host server.

In some embodiments, the terminal includes a biometric capture device. Before creating a new timekeeping record, the employee's identity is verified by comparing the newly captured biometric data to previously stored biometric data. In some embodiments, the biometric used to verify the employee's identity is hand geometry. The spread of bacteria and other microorganisms is inhibited by the inclusion of an antimicrobial material on the biometric capture device.

In some embodiments, the timekeeping terminal system includes a user interface, a biometric capture device, a local database, a first processor, and a second processor. The local database contains a plurality of timekeeping records, a plurality of stored employee identification numbers, and a plurality of stored digital representations of an employee biometric. The first processor is configured to receive an input employee identification number from the user interface and identify the employee by comparing the input employee identification number to the plurality of stored employee identification numbers. The first processor then requests and receives a new digital representation of the employee biometric from the second processor. The employee's identity is verified by comparing the new digital representation to the stored digital representation. A new timekeeping record is created if the employee's identity is verified. The second processor is configured to operate the biometric capture device and send a new digital representation of the employee biometric to the first processor when requested. In some embodiments, the digital representation is condensed to a size of nine bytes or twenty bytes. In some embodiments, the second processor is configured to perform all image processing.

Some embodiments include a method of storing timekeeping records to a global database from a plurality of client terminals. A request to create an employee identification number and a request to create a new timekeeping record are received. The employee is identified by comparing the received employee identification number to a plurality of stored employee identification numbers in a local database. A digital representation of an employee biometric is requested from a biometric processor and compared to a digital representation stored in the local database to verify the employee's identity. A new timekeeping record is created in the local database if the employee's identity is correctly verified. A connection to a host server is attempted and, once connected, the local database and the global database are synchronized. If the connection to the host server is not established, the attempt to connect is repeated. New timekeeping records can be created on the local database while the connection to the host server is repeatedly attempted.

Some embodiments include a method for synchronizing a plurality of local replicate databases with a global database. Changes to the global database are affected by changing one of the plurality of local replicate databases. The change is then communicated to the global database server where is it either accepted or rejected. In some embodiments, the rejection or acceptance is based on a timestamp associated with the new or changed object in the local database. The change is then distributed to each of the other local replicate databases when the other replicate databases are synchronized with the global database.

BRIEF DESCRIPTION OF THE APPENDICES AND DRAWINGS

DETAILED DESCRIPTION

Figure 1:
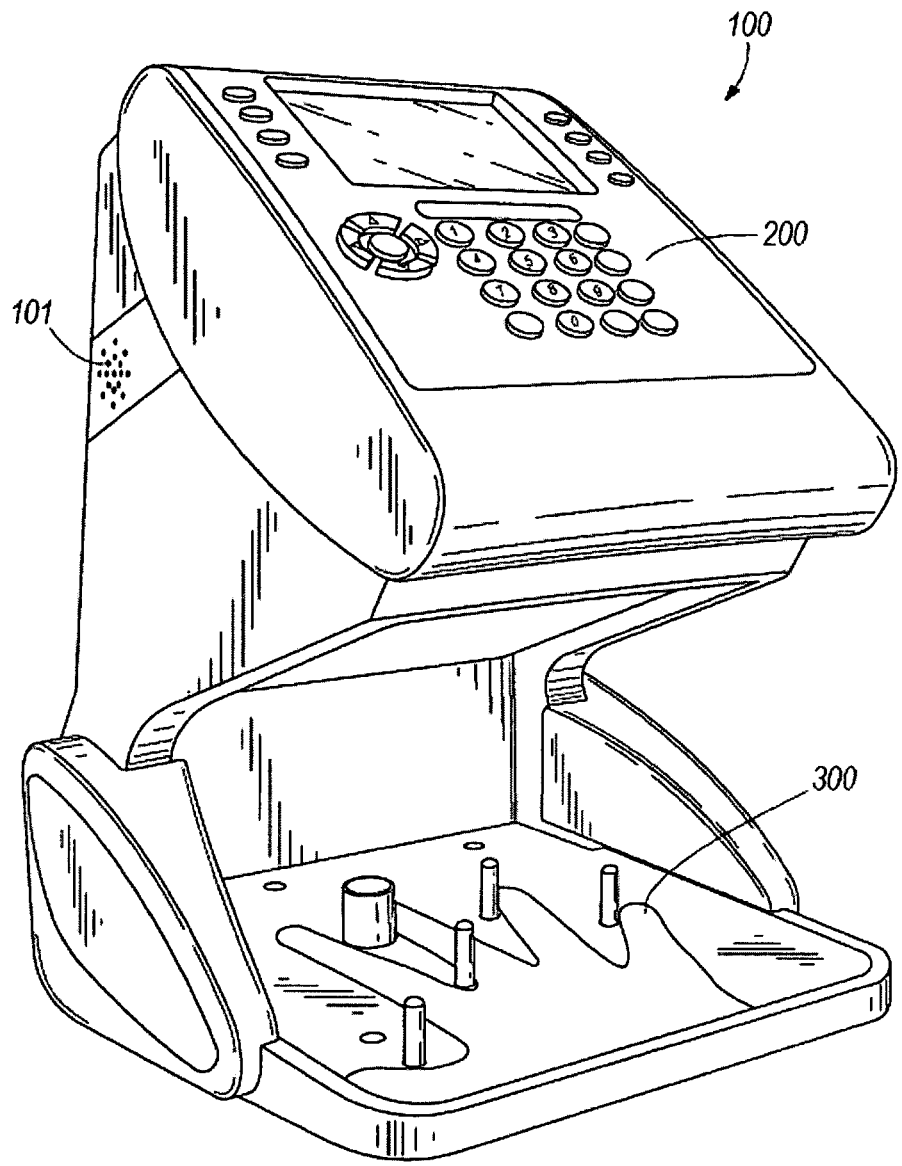
FIG. 1 is a perspective view of a terminal according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. It should be noted that a plurality of hardware and software based devices, as well as a plurality of different structural components, may be utilized to implement embodiments of the invention. Furthermore, and as described in subsequent paragraphs, the specific configurations illustrated in the drawings are intended to exemplify embodiments of the invention, and other alternative configurations are possible.

FIG. 1 shows the exterior of a time and attendance terminal 100. The terminal 100 includes a user interface panel 200 and a biometric data acquisition platen 300. Other components of the terminal 100 may include, for example, a speaker 101 and a card reader (not pictured). The terminal 100 may be placed on a level surface such as a table or a desk. Alternatively, for example, the terminal 100 may be mounted to a wall. Although the terminal 100 shown in FIG. 1 includes a hand geometry biometric data acquisition platen 300, alternative constructions may incorporate other biometric technologies including, for example, retinal scanning, iris recognition, voice recognition, fingerprint, and ear geometry.

Figure 2:
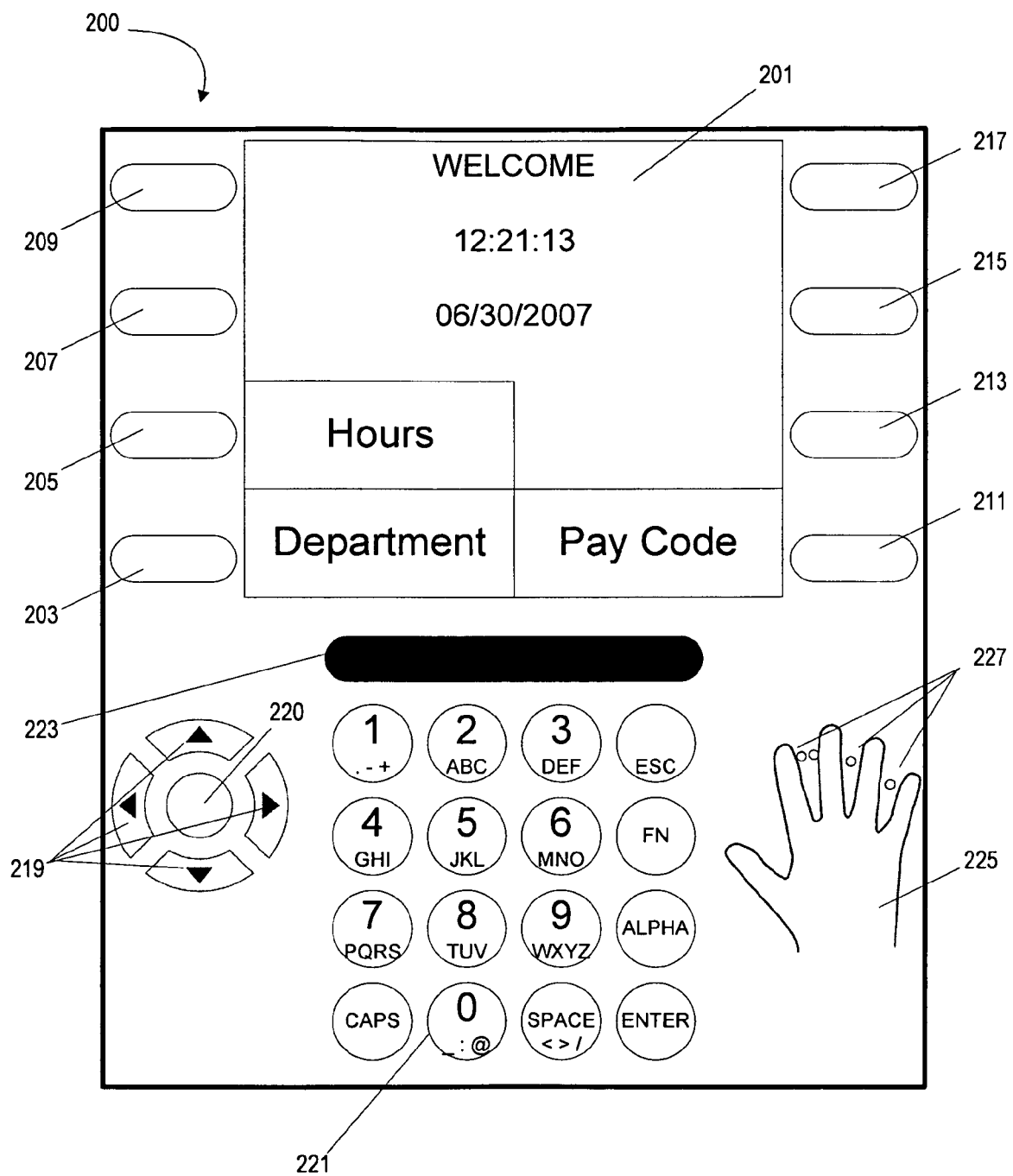
FIG. 2 is an illustration of the user interface of the terminal shown in FIG. 1.

FIG. 2 provides a more detailed view of the user interface panel 200. The user interface of this embodiment includes a graphical display 201, a plurality of function keys 203, 205, 207, 209, 211, 213, 215, and 217, a plurality of navigation buttons (up, down, left, and right) 219, a select or enter button 220, an alphanumeric keypad 221, an indicator LED 223, and graphical instructions 225 for hand placement on the hand geometry biometric data acquisition platen 300. The graphical display 201 shows the current date and time and provides instructions and information to the user. The function keys 203, 205, 207, 209, 211, 213, 215, and 217 are positioned adjacent to the graphical display 201. Because of this positioning, the display 201 can provide an indication of the function associated with each function key. For example, next to one of the function keys 205, the display 201 shows the word "HOURS." Pressing this function key 205 will cause the graphical display 201 to show the hours previously worked by the employee and the hours that the employee is scheduled to work.

The navigation buttons 219 and the select button 220 provide cursor control. The user may navigate through screens or lists shown on the graphical display 201 by pressing the up, down, left, or right button. After the user has navigated to the desired target, the select button 220 is depressed. The alphanumeric keypad 221 provides another input interface and, although it is shown in FIG. 2 as a sixteen-button keypad, alternative embodiments may provide a full QWERTY-style keyboard.

The indicator LED 223 provides information at a glance regarding the state of the terminal 100 and, as discussed in detail below, the operation of the hand geometry biometric data acquisition platen 300. The graphical instructions 225 are provided as a static image directly on the surface of the user interface panel 200 giving quick reference instructions on proper hand placement on the hand geometry biometric data acquisition platen 300. Incorporated into the graphical instructions 225 are a series of LEDs 227 each corresponding to a finger pin as discussed in more detail below.

Figure 3:
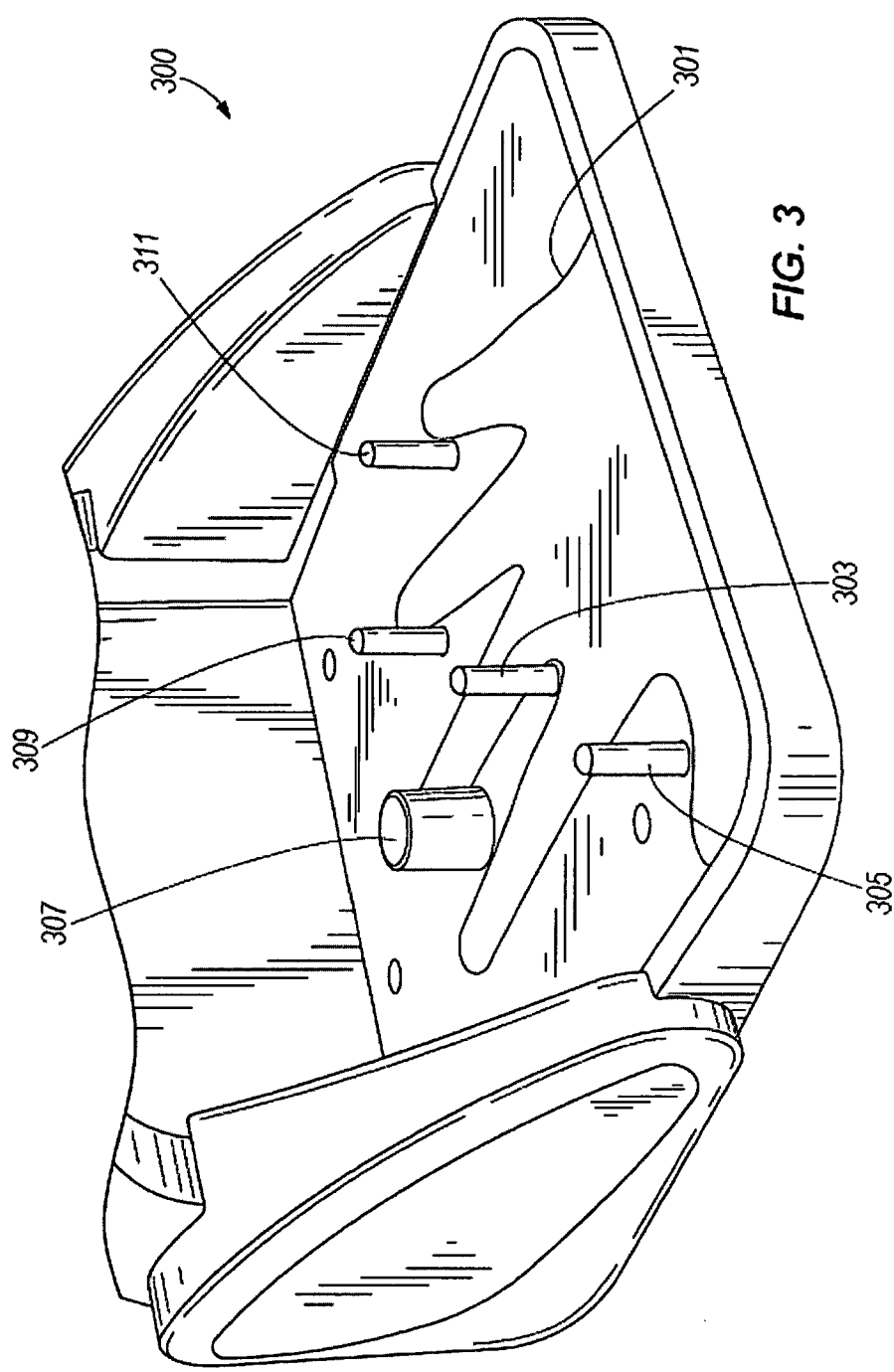
FIG. 3 is an illustration of a platen configured to capture hand-geometry biometric data in the terminal shown in FIG. 1.

FIG. 3 provides a more detailed view of the hand geometry biometric data acquisition platen 300. On the surface of the platen 300 is an outline 301 of a hand that provides a visual indicia to a user regarding appropriate placement of his or her hand. Protruding normal to the platen surface is a plurality of finger pins 303, 305, 307, 309, and 311. The finger pins 303, 305, 307, 309, and 311 provide additional guidance to the user regarding proper hand placement and are configured to detect when a finger is in contact with each finger pin.

Using the outline 301 and the finger pins 303, 305, 307, 309, and 311 as a guide, the user places her hand palm-side down on the surface of the platen 300. The user slides her hand forward until the web between the index and middle fingers stops against the web pin 303. Keeping the palm flat against the platen surface, the user will close her fingers together until they touch the appropriate finger pins 305, 307, 309, and 311. The side of the thumb contacts the pin 305, the sides of the index and middle fingers both contact the pin 307, the side of the ring finger contacts the pin 309, and the side of the pinky finger contacts the pin 311. As the user's fingers come into contact with each finger pin, the corresponding LED 227 on the graphical instructions 225 on the user interface panel 200 (FIG. 2) will turn off. If an LED 227 remains illuminated, it is an indication that the user's finger is not in proper contact with the corresponding finger pin.

The hand geometry biometric data acquisition platen 300 is one component of a biometric capture system incorporated into the terminal 100. The biometric capture system further includes a plurality of LEDs (not pictured) positioned to illuminate the platen, one or more cameras (not pictured) positioned to capture an image of the user's hand, and a biometric processor. The biometric processor is discussed in detail below.

The platen 300 includes an antimicrobial surface to reduce the spread of bacteria and other microorganisms. For example, a silver ion-based agent that inhibits the growth of bacteria and other microorganisms, such as the one produced by BioCote®, is integrated into the hand platen 300.

Figure 4:
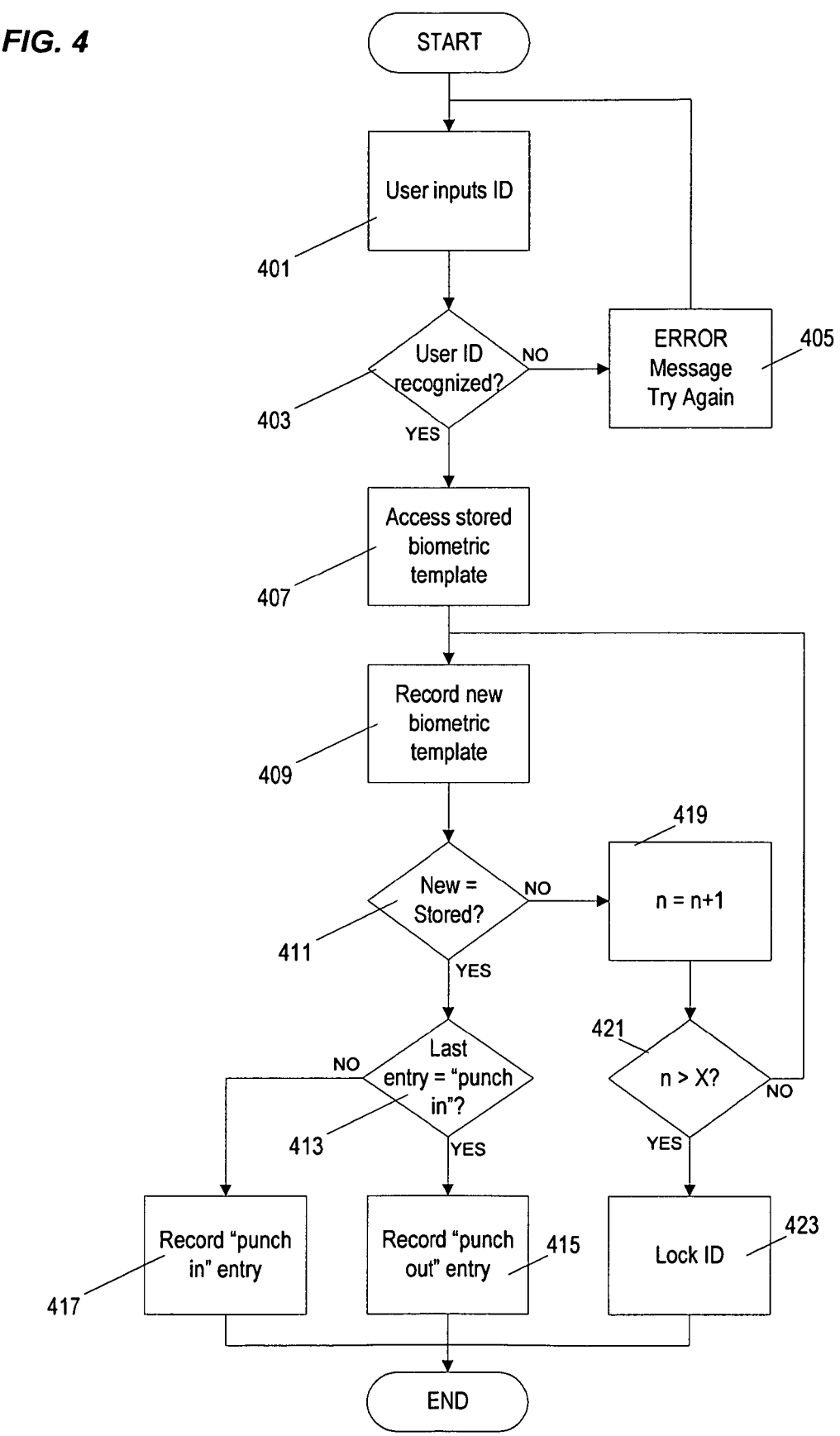
FIG. 4 is a flowchart of operations performed with and by the terminal shown in FIG. 1 when recording a timekeeping event.

FIG. 4 illustrates one method of entering a time keeping event using the terminal 100 illustrated in FIGS. 1-3. A user inputs an employee ID (step 401). This ID may be, for example, in the form of a username/password or employee ID number entered through the alphanumeric keypad 221 (FIG. 2). Alternatively, the ID may be in the form of data encoded on an employee identification card. In such embodiments, the terminal 100 includes a card reader to receive the employee identification card and read the data encoded thereon.

After receiving the employee ID, the terminal attempts to identify the employee by comparing the employee ID to the users stored in memory (step 403). If the employee ID is not recognized, the terminal displays an error message (step 405), returns to the beginning, and waits for a new employee ID input. If, however, the employee ID is recognized, the terminal accesses a biometric template stored in memory (step 407). In this example, the biometric template is not an "image" of the user's hand, but, rather, a condensed hash code representative of the unique geometry of a user's hand. Although the size of the biometric template can be varied depending upon the type of biometric used and the amount of specificity needed, the terminal in this example is capable of producing a low-resolution biometric template that is nine bytes in size or a high-resolution template that is twenty bytes in size. The terminal then instructs the user to place her hand on the hand geometry biometric data acquisition template and generates a new biometric template (step 409). The employee's identity is then verified by comparing the newly captured biometric template with the previously stored biometric template (step 411).

If the biometric templates match, the terminal 100 in this example automatically determines whether the timekeeping entry should be recorded as a "punch in" or as a "punch out." If the last previously recorded timekeeping entry was a "punch in," the terminal determines that the new timekeeping entry should be a "punch out" (step 413). Conversely, if the last entry was a "punch out," then the new timekeeping entry is recorded as a "punch in" (step 415). Some alternative embodiments are not configured to automatically determine the type of the new timekeeping entry and the user must indicate whether the entry is a "punch in" or "punch out" using the user interface panel 200 of FIG. 2.

If the biometric templates do not match, an error counter ("n") is incremented (step 419). If the error counter ("n") has not yet exceeded an error count threshold ("X") (step 421), the terminal 100 instructs the user to try again and records another new biometric template (step 409) to compare to the previously stored template (step 411). If the error counter ("n") exceeds the preset error count threshold ("X"), the employee ID is locked (step 423) and the user is not be allowed to punch-in or punch-out. This lock may be maintained, for example, for a preset period of time or until a system administrator releases the lock.

An incorrect match between the newly captured biometric template and the previously stored biometric template can occur for several reasons. For example, the geometry of the employee's hand may have changed due to growth or injury and the stored biometric template must be updated. However, an incorrect match will also occur when the person attempting to punch-in is not the person associated with the employee ID that was used. The lock placed on the employee ID allows the system administrator to identify when an updated biometric template is required for an individual employee and to identify and investigate suspected "buddy punching."

Depending upon the function used to generate the biometric template from the image of the user's hand, it is possible that even a correct match will not result in a newly captured biometric template that is identical to the previously stored biometric template. As such, a differencing algorithm may be used to compare the newly captured biometric template to the previously stored biometric template. In one differencing algorithm, a read score is generated that is indicative of the amount of similarity between the newly captured biometric template and the previously stored biometric template. If the read score exceeds a preset threshold, the terminal concludes that the biometric templates match.

The terminal is also configured to use a second preset threshold to determine when the geometry of a user's hand has changed to such a degree that a new, stored-biometric template is required. As the user's hand changes (due, for example, to injury or growth), the similarity between a newly captured biometric template and the previously stored biometric template diminishes. With this diminished similarity comes a lower read score. The terminal is configured with a second threshold that is higher than the first. As discussed above, if the read score is below the first threshold, the terminal concludes that the templates do not match. If, however, the read score is below the second threshold, but above the first threshold, the terminal recognizes that, although the biometric templates still match, the user's hand geometry has changed to an extent that a new stored biometric template is required. Depending on the configuration, the terminal then either notifies the system administrator that a new stored biometric template is required or stores the biometric template that was captured during the verification process as the new stored biometric template.

Figure 5:
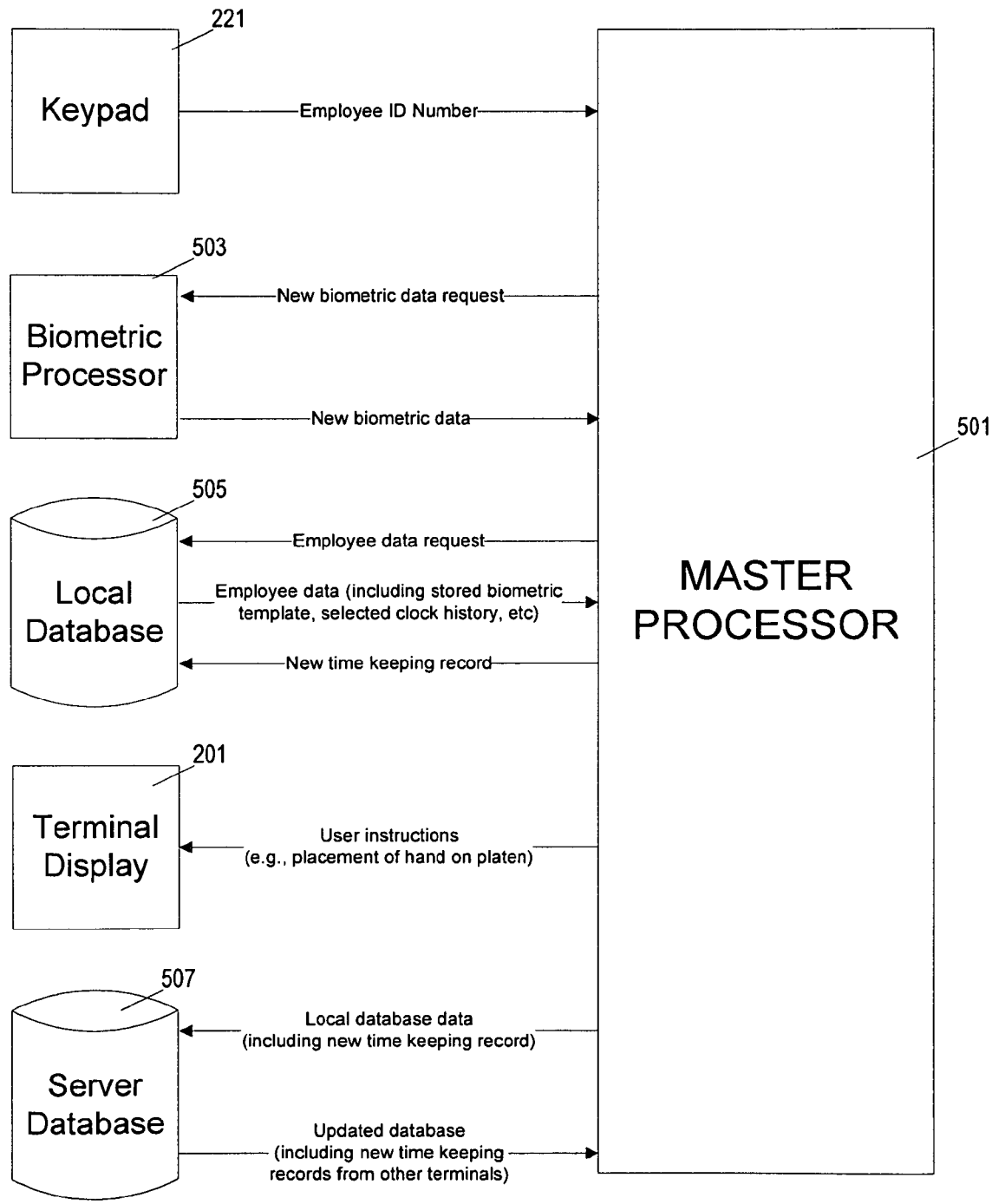
FIG. 5 is a block diagram illustrating data flow between components within the terminal shown in FIG. 1.

FIG. 5 illustrates the data flow between certain components of the terminal during the method of FIG. 4. The components as shown in FIG. 5, including the master processor 501, the keypad 221, the biometric processor 503, the local database 505, the terminal display 201, and a server database 507, are arranged to highlight the sequence of steps illustrated in FIG.

4. FIG. 5 is not intended to illustrate physical locations or to limit the components included in the terminal 100.

As shown in FIG. 5, the employee ID number is sent from the alphanumeric keypad 221 to the master processor 501. The master processor 501 then requests and receives a new biometric template from the biometric processor 503 (the interactions between the master processor and the biometric processor are discussed in detail below). The master processor 501 sends a request for employee data to the local database 505. This request may include the employee ID number originally received from the alphanumeric keypad 221. The master processor 501 then receives employee data, including the stored biometric template associated with the employee ID number and previous timekeeping records, from the local database 505. If a new timekeeping record is created during the method shown in FIG. 4, the new timekeeping record is sent to the local database 505. Throughout execution of the method of FIG. 4, user instructions and messages are sent from the master processor 501 and shown on the terminal display 201. As discussed in detail below, in some embodiments, the master processor 501 is also configured to interact with a server to synchronize the local database 505 with a global database 507 located at the server.

Although the example in FIGS. 4 and 5 illustrates an employee using the terminal 100 to "punch in" or "punch out," the terminal 100 may be configured for other time and attendance applications for employee and workflow management. For example, the terminal 100 can be used by a manager to create work schedules that might then be viewed by the employees at a terminal 100. Multiple terminals connected in a networked system can be configured to allow cross-punching and labor transfers. The terminal 100 can also be configured to perform operations unique to the environment in which it is used. For example, the terminal 100 can be configured to allow employees in a restaurant to record and track tips received whereas a warehouse employer can configure the terminal 100 to track and display the licensing status of people punching-in as forklift operators.

To implement these functionalities, an employer can create a customization. A customization in this embodiment includes a series of text-based scripting commands that dictate what is shown on the graphical display 201 and what operations are associated with the function keys 203, 205, 207, 209, 211, 213, 215, and 217. For example, the following script might be used to create the customization running on the user interface panel 200 in FIG. 2.

```
TABLE                                       ;Begin table definition
    F1 DEPT FIRST LABEL "Department" AUTH 5  ;Describe F1 button,
                                            ;        only level 5 user can get in
    F2 DEPTPAYCODE LAST LABEL "Pay Code"    ;Describe F2 button
    F3 HOURS FIRST LABEL "Hours"            ;Describe F3 button
END                                         ;End table definition
COLLECT DEPT                                ;Begin data collection definition
    PROMPT "ENTER DEPARTMENT"               ;Displayed on first line of LCD
    LENGTH 3                                ;Limit data entry to 3 characters
    TYPE NUMBER                             ;Format the data entry to a number
    TACODE 20                               ;TACODE 20 is tagged with the data entry
    ENTER                                   :Data entry completes upon pressing
                                            ;        'ENTER' button
    VALID DEPTCODE                          ;Validates user input
END                                         ;End collection definition
    VALID DEPTCODE 500-999 300 400          ;Valid department codes are 300, 400,
                                            ;        or any three digit numbers in range
                                            ;        of 500-900 inclusive
MENU DEPTPAYCODE                            ;Begin menu definition
    LINE 1 "1-DEPARTMENT"                   ;Displayed on first line of LCD
    LINE 2 ":2-PAYCODE"                     ;Displayed on second line of LCD
    NEXT1 DEPT 2                            ;Go here when F1 key is pressed
    NEXT2 PAYCODE                           ;Go here when F2 key is pressed
END                                         ;End menu definition
COLLECT DEPT2                               ;Begin data collection definition
    PROMPT "ENTER DEPARTMENT"               ;Displayed on first line of LCD
    LENGTH 3                                ;Limit data entry to 3 characters
    TYPE NUMBER                             ;Format the data entry to a number
    ENTER                                   ;Data entry completes upon pressing
                                            ;        'ENTER' button
    TACODE 33                               ;TACODE 33 is tagged with the data entry
END                                         ;End collection definition
COLLECT PAYCODE                             ;Begin data collection definition
    PROMPT "ENTER PAYCODE"                  ;Displayed on first line of LCD
    LENGTH 3                                ;Limit data entry to 3 characters
    TYPE NUMBER                             ;Format the data entry to a number
    ENTER                                   ;Data entry completes upon pressing
                                            ;        'ENTER' button
    TACODE 34                               ;TACODE 34 is tagged with the data entry
END                                         ;End collection definition
INFO HOURS                                  ;Begin information display definition
    PROMPT "HOURS WORKED"                   ;Displayed on first line of LCD
    TYPE NUMBER                             ;Number with no formatting
    ATTR "chfPayperiodTotalHours"           ;Value of this user attribute will be
                                            ;        displayed
    UNSIGNED                                ;Default is unsigned
END                                         ;End information display definition
```

Although the script example shown above is not necessarily derived from any particular scripting language, embodiments of the terminal 100 might support, for example, a known scripting language such as JavaScript, a known programming language such as C++, a customized standard format such as XML, or a proprietary scripting language that can be interpreted by the terminal's master processor 501.

The text-based script can be created, for example, on the terminal 100 using the alphanumeric keypad 221 or on a desktop computer connected to the terminal 100. In some embodiments, a graphical user interface is provided to allow those not familiar with computer programming to create a customization. As discussed in detail below, in a networked system, the connected terminals 100 can be synchronized to use the same customization.

As discussed above, the terminal 100 includes, in one example, two processors—a master processor 501 and a biometric processor 503 (FIG. 5). In this example, the biometric processor 503 is configured as a slave processor and operates in response to commands received from the master processor 501. The biometric processor 503 controls the operation of the biometric capture device, the acquisition of an image of the user's hand geometry, and the processing of the image to create a biometric template. In constructions that utilize other biometrics, such as, for example, voice recognition, the biometric processor 503 is dedicated to controls the biometric capture device and processes the audio signals to create a biometric template. By incorporating a dedicated biometric slave processor 503 into the terminal 100, the resources of the master processor 501 are available to perform other operations such as local database maintenance, client-host synchronization (as discussed in detail below), and user interface management.

Figure 6:
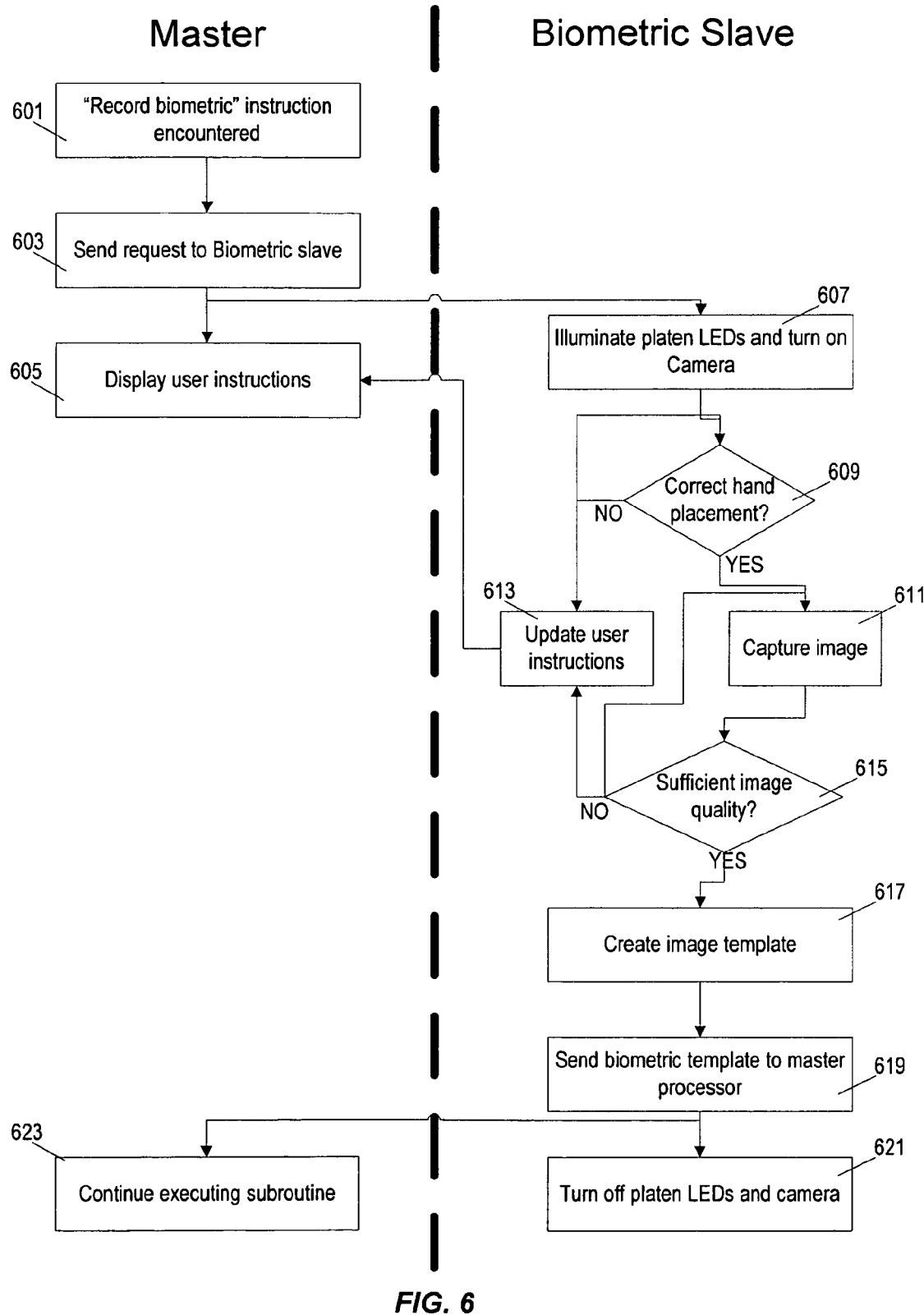
FIG. 6 is a flowchart showing operations performed by each of the two processors while capturing biometric data.

FIG. 6 illustrates how functional operations are distributed between the master processor 501 and the biometric slave processor 503 during a biometric data acquisition operation. As mentioned in the discussion of FIG. 4, the terminal 100 encounters circumstances that require a newly captured biometric template. The method illustrated in FIG. 6 begins when an instruction to record a new biometric template is encountered (step 601). The master processor 501 sends a request for a new biometric template to the biometric slave processor 503 (step 603) and displays instructions to the user through the graphical display 201 on the user interface panel 200 (FIG. 2) (step 605). The biometric slave processor 503 then illuminates the platen LEDs and turns on the one or more cameras (step 607). As discussed above in reference to FIG. 3, the biometric processor 503 then checks for correct hand placement on the finger pins 303, 305, 307, 309, and 311 (step 609). If hand placement is correct, the biometric slave processor 503 begins to take pictures of the user's hand geometry (step 611). If, however, the hand placement is incorrect, the biometric processor 503 sends an update to the master processor 501 and updated user instructions are displayed (step 605). The biometric slave processor 503 repeatedly checks for correct hand placement (step 609) until correct hand placement is confirmed.

In some embodiments, after the image is captured, the image is evaluated for quality (step 615). This evaluation step can include examining the content of the acquired image to determine if an adequate biometric template can be created. If the image is not of sufficient quality, the user instructions are updated (step 613) and the biometric processor 503 captures another image (step 611). If the image quality is sufficient, the biometric processor 503 processes the image to create the biometric template (step 617). After the template is created it is sent to the master processor 501 (step 619). The biometric slave processor 503 then turns off the platen LEDs and the camera (step 621) and waits for another request from the master processor 501.

After receiving the biometric template from the biometric processor 503, the master processor 501 continues to execute the subroutine that required the newly captured biometric template (step 623). In this "black box" configuration, the operation of the biometric processor 503 does not depend upon the operation being performed by the master processor 501. Whether the terminal 100 is verifying an employee's identity, adding a new stored biometric template to the database, or performing some other task, the operation of the biometric processor 503 is the same. In some constructions, however, the master processor 501 may send additional information with the request for a new biometric template such as, for example, the required resolution of the new template.

Similarly, the operation of the master processor 501 is not dependent upon the operation of the biometric slave processor 503. Although the subroutine that requires the new biometric template will be delayed until the biometric template is received from the biometric processor 503, the master processor 501 is available to perform a variety of other operations while waiting for the new biometric template. The master processor 501 may receive periodic updates from the biometric slave processor 503 so that the displayed user instructions can be appropriately updated. However, because, resource-intensive image processing is being performed independent of the master processor 501, delays and system slow-down are minimized in the dual-processor terminal 100.

The periodic updates received by the master processor 501 from the biometric slave processor 503 can be displayed to the user in a variety of ways. As discussed above, the series of small LEDs 227 incorporated into the graphical instruction component 225 on the user interface panel 200 provide information regarding finger placement (correct and incorrect). Additionally, textual instructions can be displayed to the user on the graphical display unit 201. The indicator LED 223 is also used to provide quick-reference information regarding the status of the biometric capture unit. The indicator LED 223 is configured to periodically blink or change color in response to information received from the biometric slave processor 503. For example, when the biometric processor 503 is ready for the user's hand to be placed on the biometric data acquisition platen 300, the indicator LED 223 slowly blinks an amber color. If, however, the user has entered an incorrect or locked out employee identification number, the indicator LED 223 remains blank and the user will not be instructed to place his hand on the biometric data acquisition platen 300. After the hand has been placed on the platen 300 and an image has been captured, the indicator LED 223 changes to a solid purple color. If the biometric templates match and the employee's identity is correctly verified, the indicator LED 223 changes to a solid green color. If, however, the terminal 100 concludes that the biometric templates do not match, the indicator LED 223 changes to a solid red color. The textual instructions on the graphical display 201 then instruct the user to try again or inform the user that the retry count has been exceeded and the employee identification number has been locked out.

Figure 7:
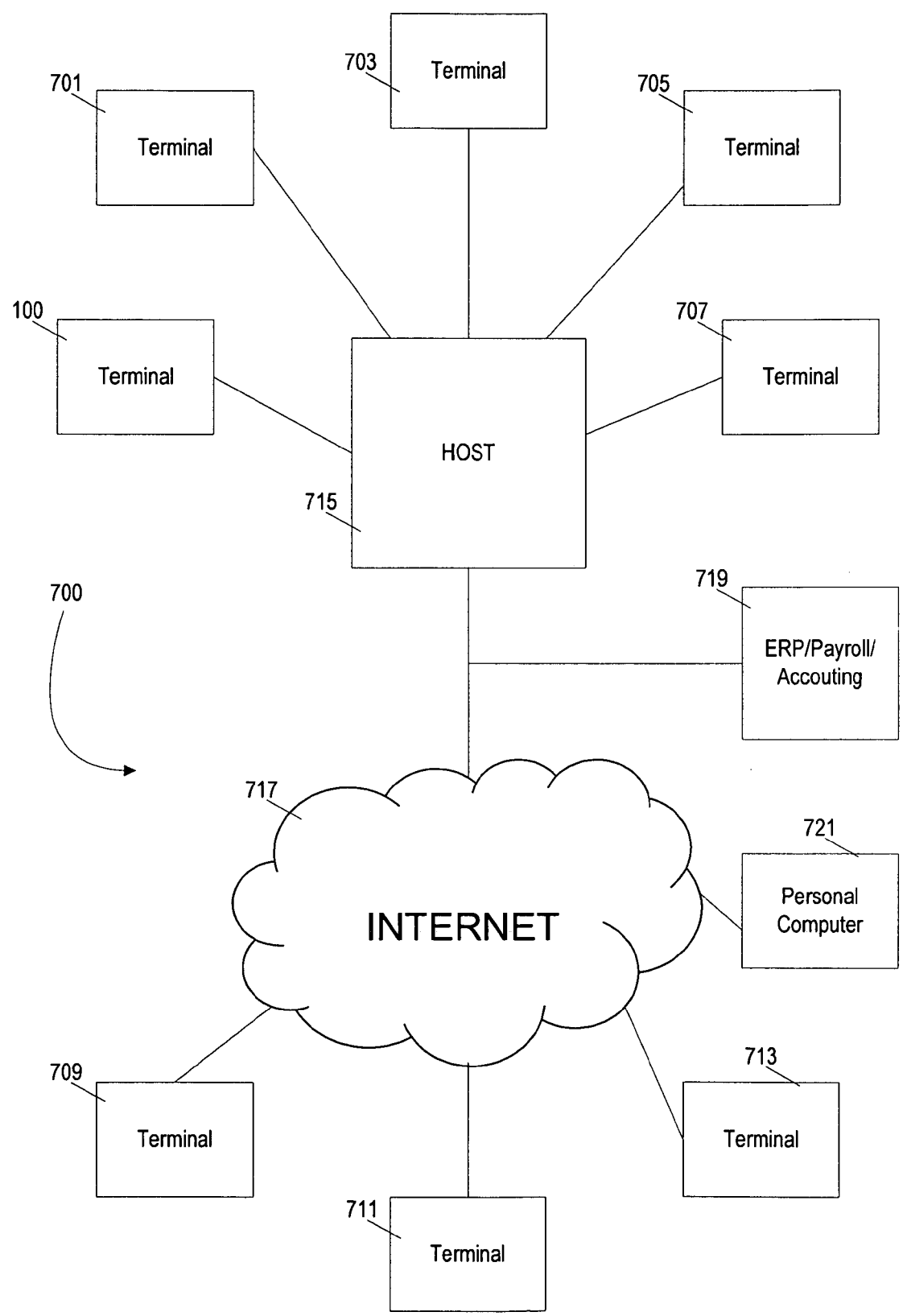
FIG. 7 is a block diagram of one construction of a networked time and attendance system including the terminal shown in FIG. 1.

FIG. 7 illustrates one example of a networked time and attendance system 700 including the terminal 100 of FIG. 1. Multiple client terminals 100, 701, 703, 705, 707, 709, 711, and 713 are connected to the host server 715. Client terminals 100, 701, 703, 705, and 707 are connected directly to the host server 715 by wired or wireless means such as, for example, CAT-5, USB, RS-232, RF wireless, infrared wireless, Wi-Fi, or Bluetooth™. Additionally, client terminals 709, 711, and 713 are connected to the host server 715 through an Internet connection 717. The networked time and attendance system 700 is also configured to interact with other systems 719, such as, for example, electronic resource planning (ERP) systems, payroll systems, and accounting systems. A personal computer 721 with a connection to the Internet 717 can also be configured to communicate with the host server 715 or the client terminals 100, 701, 703, 705, 707, 709, 711, and 713.

Although a single terminal 100 may be sufficient for employers with a relatively small number of employees, a networked time and attendance system 700 can be implemented by large employers where many employees will be punching in and out within a small period of time. For example, a large factory with several thousand employees working in multiple departments might implement a networked time and attendance system 700 with one or more terminals in each department. Similarly, a restaurant owner with multiple locations throughout the country might implement an Internet-based time and attendance system 700 with one terminal at each restaurant.

Figure 8:
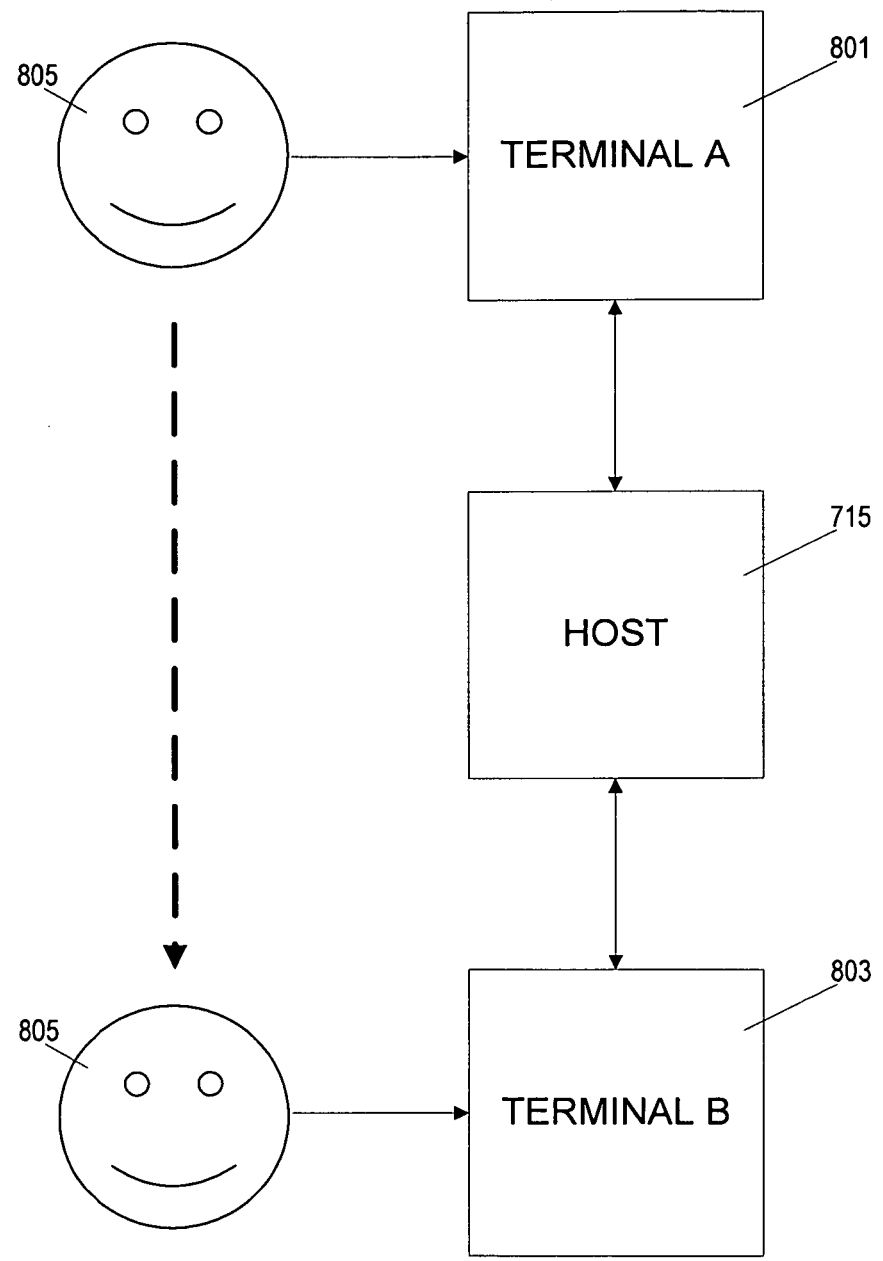
FIG. 8 is a block diagram illustrating the networked time and attendance system of FIG. 7 as observed by the same employee using multiple different terminals.

Several of the examples below will refer back to the scenario illustrated in FIG. 8 wherein the first and second terminals, 801 and 803 respectively, are connected to the same host server 715 and the same employee uses both terminals 801 and 803 at different times. As depicted in FIG. 8, the networked time and attendance system 700 in this example provides a uniform interface such that an employee has the same experience when using either the first terminal 801 or the second terminal 803.

As discussed above in reference to FIG. 5, each terminal 100 is equipped with a local database 505 and is configured to connect to a global database 507 located at the host server 715. The networked time and attendance system 700 of FIG. 7 utilizes a technique known as database replication to ensure that each local database 505 is synchronized with the global database 507. The database synchronization process in this example runs in two phases—first sending updates from the terminal's local database 505 to the global database 507 and then requesting updates from the host's global database 507 to the local database 505.

Figure 9:
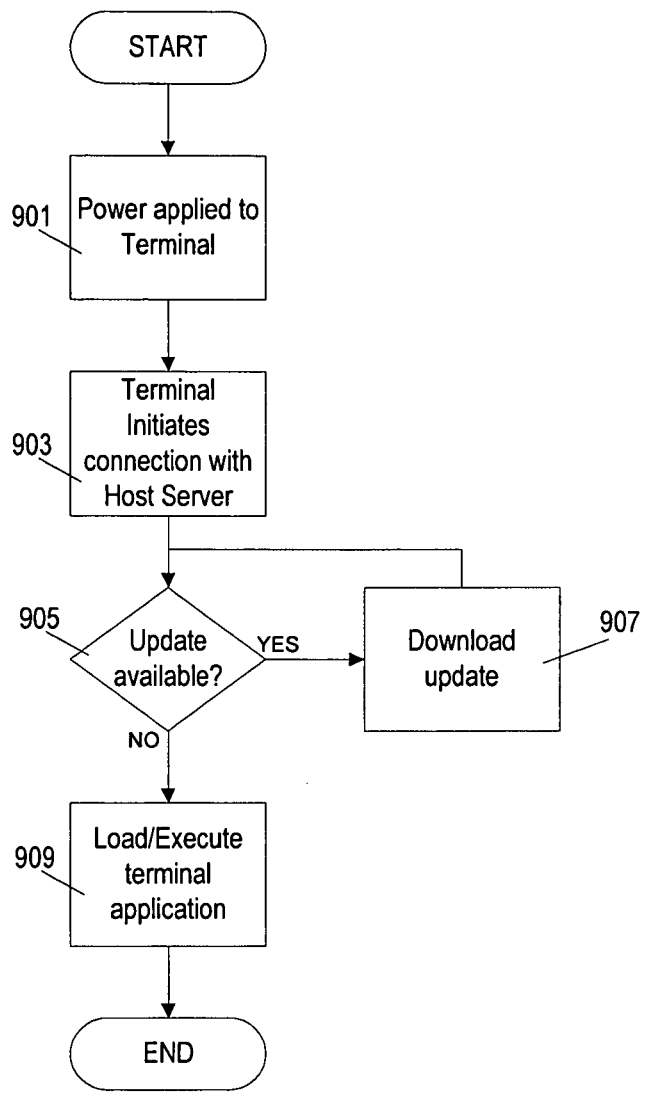
FIG. 9 is a flowchart of a terminal start-up sequence in the networked time and attendance system shown in FIG. 7.

FIG. 9 illustrates one type of synchronization from the perspective of the client terminal 100. In this embodiment, synchronization occurs whenever the terminal 100 is powered up. After power is applied to the terminal 100 (step 901), but before the terminal 100 begins running its standard software application, the terminal 100 initiates a connection with the host server 715 (step 903). The terminal 100 then queries the host server 715 for any available updates (step 905). These updates could be in the form of new or modified database entries, updated operating system or application software, or a customization. If an update is available, it is downloaded to the client terminal 100 (step 907). The terminal 100 continues to repeat this query (step 905) until no further updates are available. The terminal 100 then proceeds to load and execute the terminal application software (step 909).

However, time and attendance terminals, such as terminal 100, are not often rebooted. Particularly in environments where three or more employee shifts rotate, time and attendance systems must be available twenty-four hours every day. Because some terminals may not be restarted for weeks or even months, it is important that the synchronization operations be executed more frequently than just at system start-up. Synchronization timing can be governed by a number of various events. For example, the terminal 100 can be configured to initiate a synchronization with the host server 715 each time a change is made to the local database 505. Synchronizations might also be initiated at a scheduled time and date or after a period of time has elapsed since the last previous synchronization.

A synchronization schedule can be designed and implemented to best suit the needs of the particular employer. For example, in some work environments a large number of people punch in and out within a few minutes of each other. For example, if a shift is scheduled to start at 8:00 AM and end at 4:00 PM, multiple networked terminals process several timekeeping requests around 8:00 AM and 4:00 PM each day. If a second shift begins at 4:00 PM (when the first shift ends) and ends at 12:00 AM, the number of timekeeping transactions may double at 4:00 PM as compared to 8:00 AM, when the first shift employees punch-in, but no employees from the second shift punch out. If several terminals are attempting to connect to and synchronize with the same host server 715 at the same time, several of the connections might fail.

Figure 10:
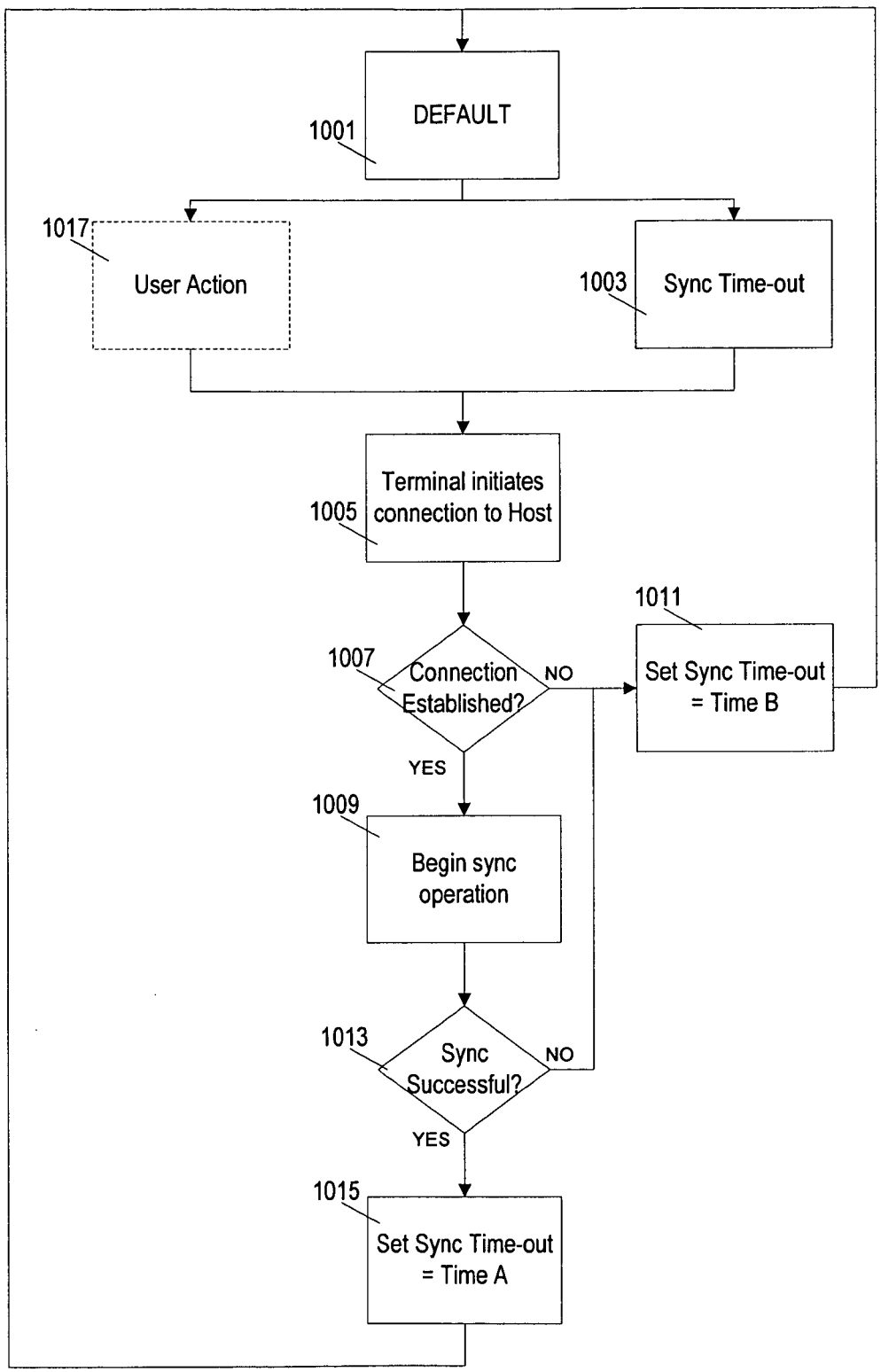
FIG. 10 is a flowchart of operations performed by a terminal while synchronizing with a host server in the networked time and attendance system shown in FIG. 7.

The method shown in FIG. 10 illustrates a hybrid approach where the terminal 100 is configured to initiate a connection to the host server 715 after a predetermined time has elapsed since the last synchronization and in response to changes in the local database. The terminal 100 in this example is also configured to respond to failed connections and to continue operating while repeating the attempt to synchronize with the global database 507 on the host server 715.

The terminal 100 begins in a default state (step 1001). During this state, users can access the terminal 100 to check work schedules, punch in and out, or perform other operations that the terminal 100 is configured to perform. As discussed above, the terminal 100 is equipped with a local database 505 that has been synchronized with the global database 507. Therefore, the local operations performed by the user during the default state (step 1001) read data from and write data to the local database 505.

A time-out occurs when the predetermined time period has elapsed since the last synchronization (step 1003). In response to this time-out, the terminal 100 attempts to initiate a connection with the host server 715 (step 1005). If the connection is established successfully (step 1007), the terminal 100 begins a synchronization (step 1009). If the host server 715 is unavailable (such as when multiple terminals are attempting to contact the host server 715 at the same time), the terminal 100 sets the time-out to equal a shorter "retry" time period (step 1011). The terminal 100 then returns to the default state (step 1001) where it can continue to perform operations using the local database 505 before attempting to connect again.

If the connection terminates before the synchronization is completed successfully (step 1013), the terminal 100 again sets the time-out period to equal the shorter "retry" time period (step 1011) and returns to the default state (step 1001) until the "retry" time-out expires. If the synchronization completes successfully, the synchronization time-out is reset (step 1015) and the terminal 100 returns to the default state (step 1001). In some embodiments, after a successful synchronization, the host server 715 sends the time period for the synchronization time-out to the terminal 100. In this way, although the client terminal 100 initiates each connection with the host server 715, the host server 715 retains a level of control in scheduling when each terminal attempts to connect.

The terminal 100 in FIG. 10 is also configured to exit the default state (step 1001) in response to a user action that changes the contents of the local database 505 (step 1017). When such a user action occurs, the terminal 100 attempts to initiate a connection to the host server 715 (step 1005) and repeats the attempt as necessary as described above.

Depending upon the size of the database, a synchronization can take several minutes. When, as described above, a large number of employees are attempting to punch in or out at a shift change, the host system 715 is busy with multiple attempted synchronizations and failed connections are more common. The system illustrated in FIG. 10 accounts for this situation by allowing the terminal 100 to continue operating using the local database 505 even when connection to the host server 715 cannot be established. Some embodiments further reduce the amount of network congestion by performing only a partial synchronization or update to the terminal 100 in response to a user action that changes the local database 505 (step 1017). For example, if the user action creates a new timekeeping record, the terminal 100 sends only the new timekeeping records to the global database 507 instead of performing a complete synchronization. Therefore, punch data is maintained on the global database 507 in near real-time without requiring a full database synchronization.

Alternatively or in addition, a partial synchronization might be configured to only send critical updates between the host server 715 and the terminal 100. These critical updates might include, for example, new users added to the system, updated biometric templates, or employee ID locks (as discussed above in reference to FIG. 4). In times with unusually high network activity, the terminal 100 and the host 715 can be configured to perform only a partial synchronization rather than a full synchronization.

When the biometric processor 503 is not actively capturing a new biometric template, the indicator LED 223 located on the user interface panel 200 (FIG. 2) is configured to provide an indication of the terminal's network connection status. When the terminal 100 is not connected to the host server 715, the indicator LED 223 shows a solid amber color. When the terminal 100 is successfully connected to the host server 715, the indicator LED 223 changes to a solid blue color. If the terminal 100 experiences a problem that requires network administrator intervention, the indicator LED 223 indicates this malfunction by showing a solid red color.

The host server 715 is configured with a user interface. In this example, the host server user interface includes a software application running on a personal computer 721 connected to the host server 715 through an Internet connection 717 (FIG. 7). However, in other embodiments, the host user interface can be, for example, a software application running directly on the host server 715 and accessible through a monitor and keyboard connected to the host server 715. As mentioned above, although each terminal 100 initiates the connection with the host 715, the host server 715 can be configured to instruct the terminal 100 when or how often to initiate such a connection. Through the host-server user interface, a system administrator can set the duration of the synchronization time-out for each terminal 100 (as discussed above in reference to FIG. 10). Alternatively, the system administrator can define a particular time of day for each terminal 100 to initiate a synchronization. For example, if the system administrator wants a particular terminal 100 to initiate a synchronization every hour at 27 minutes past the hour (i.e., 8:27 AM, 9:27 AM, 10:27 AM, etc), the system administrator defines the schedule through the host server user interface and the schedule is distributed to the terminal 100 during the next synchronization operation. The host server 715 can be configured to allow the system administrator to schedule a one-time synchronization at a particular date and time or synchronizations that repeat, for example, once every hour, day, month, week, or year.

The importance of proper synchronization scheduling can be better understood with reference to FIG. 8. An employee 805 uses terminal A 801 to punch in at the beginning of his shift. At some point during the work day, this timekeeping record is relayed from the local database 505 on terminal A 801 to the global database 507 on the host server 715 and, eventually, to the local database 505 on terminal B 803. If the employee 805 uses terminal B 803 to punch out at the end of his shift, the employee 805 is presented the same data and interface that is presented to him when using terminal A 801 to record the punch out entry.

However, assume that shortly after punching in at terminal A 801, the employee 805 is instructed to transfer to a different department. In some situations, the employee 805 will use terminal A 801 to record the transfer timekeeping entry. In that case, the employee's previous "punch in" timekeeping entry is already stored in the local database 505 of terminal A 801 and, therefore, the synchronization schedule is set to synchronize more infrequently. However, in situations where there are more than one terminal in close proximity and frequent timekeeping entries are common, the synchronization schedule is set to occur more frequently so that timekeeping entries are relayed quickly.

In the example above, a system administrator manually enters synchronization schedules into the host server 715. However, in other constructions, the host server 715 is configured to adapt to observed network patterns. For example, if the host server '715 recognizes that two particular terminals, 709 and 711, experience an unusually high number of frequent "department transfer" timekeeping records, the host server 715 will adapt by scheduling more frequent synchronizations for those terminals 709 and 711.

In a similar example, the adaptive host server 715 recognizes that one particular terminal 705 receives an average of two timekeeping records per employee per day (i.e., a "punch in" and a "punch out"). Almost every employee that punches in at that terminal 705 also punches out at that terminal 705 and all such records occur within fifteen minutes of the scheduled shift changes at 8:00 AM, 4:00 PM, and 12:00 AM. Because the information on this terminal's local database 505 is unlikely to be needed on other terminals, the host server 715 schedules this terminal 705 to synchronize with the global database 507 once every four hours. These synchronizations are scheduled at 8:45 AM, 12:45 PM, 4:45 PM, 8:45 PM, etc to avoid network congestion during times of peak activities (i.e., during scheduled shift changes).

As discussed above, some embodiments of the host-server user interface include a standard QWERTY keyboard and monitor attached directly to the host server 715. Alternatively, the host server user interface can include a software application running on a personal computer that is connected to the host server 715 through, for example, a local area network or an Internet connection 717. The host server user interface can be used for several administrative functions. In addition to scheduling synchronizations for each terminal, the host terminal user interface can be used, for example, to view and edit previous employee timekeeping records, enter employee work schedules, manage terminal properties, schedule and assign software updates, and manage distribution of customizations.

In some constructions, the administrative functions available through the software applications running through the host server user interface include the ability to add users, edit user information, and schedule audible alarms that signal shift changes. Although in the examples discussed above, the terminal 100 is configured to initiate a connection to the host server 715, in some constructions, the host server 715 is also configured to initiate such a connection. The connection is initiated from the host server 715 if, for example, a new user is added to the system through the host server user interface or if a system administrator requests a full or partial synchronization through the host server user interface.

Figure 11:
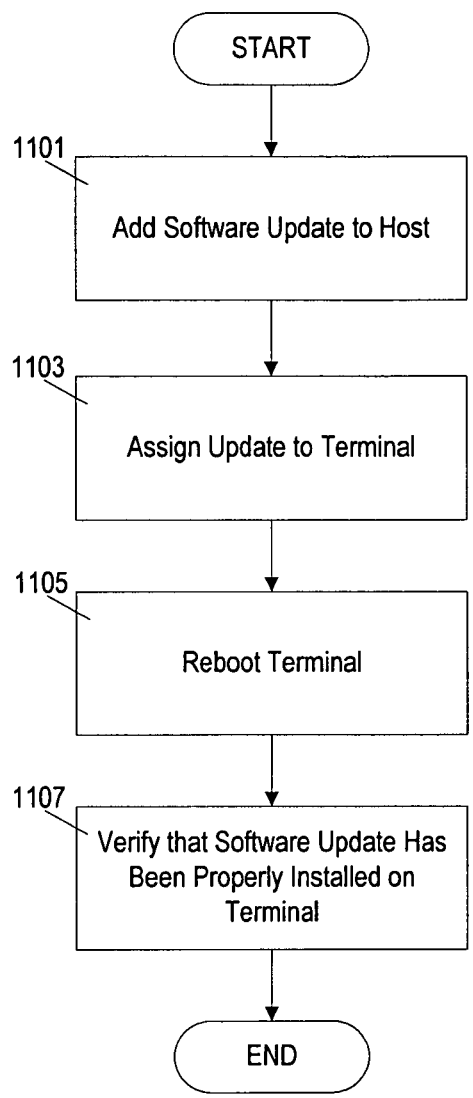
FIG. 11 is a flowchart of one method of distributing software updates to networked terminals.

FIG. 11 illustrates a method of updating terminal software through the host server user interface. The updated software is first added to the host server 715 (step 1101). This can be done, for example, by copying the software from a disk to the host server 715, downloading the software through an Internet connection 717, or by drafting the new software code directly through the host server user interface. After the updated software is on the host server 715, the system administrator uses the host server user interface to assign the updated software to one or more terminals (step 1103). As discussed above in reference to FIG. 9, during system start-up, the terminal 100 is configured to query the host server 715 for available software updates. Therefore, when the assigned terminals are rebooted (step 1105), they download and install the new software update. Finally, the host server 715 verifies that the software update was properly received by the terminal 100 and that the terminal 100 is operating correctly (step 1107). The terminal 100 and host server 715 can be configured to perform the verification automatically or, alternatively, the system administrator can visit the newly updated terminal 100 and manually verify correct operation.

As discussed above, in some environments, rebooting of the terminals is infrequent. Therefore, in some embodiments, the system administrator manually reboots the terminal 100 after assigning the updated software. In other embodiments, the host server 715 is configured to notify the terminal 100 during a database synchronization that a software update is available. The terminal 100 then reboots during the next available period of inactivity.

Figure 12:
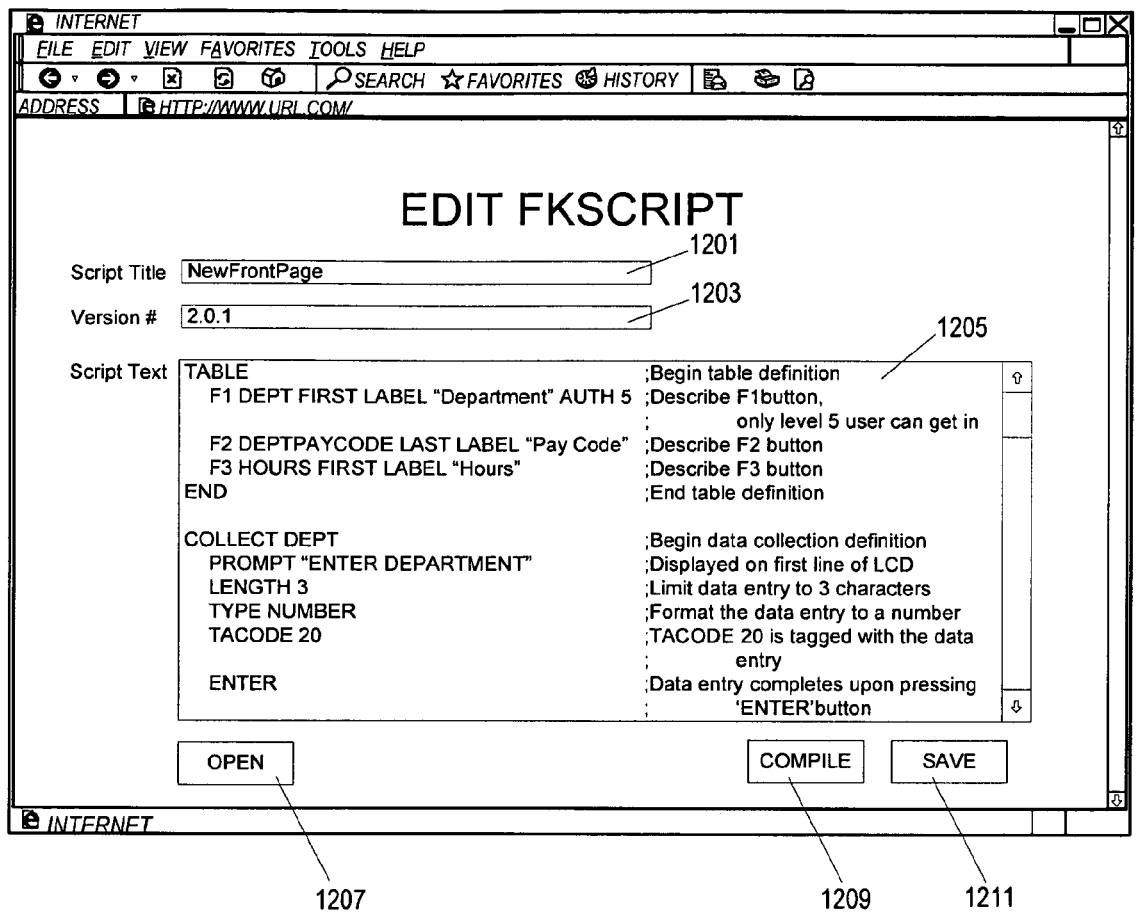
FIG. 12 is an illustration of a screen from a software application that is used to create a customization.

In some embodiments, in addition to handling software updates, the host-server user interface manages and distributes customizations. As discussed above, a customization can be created either directly through the user interface 200 on the terminal 100 or through a computer connected to the terminal 100. In the networked time and attendance system 700 of this example, the customization can be created and managed using the host server user interface. FIG. 12 provides a screen-shot of a software application for creating customizations that is running through the host server user interface. The software includes a title field 1201 and a version number field 1203 for the customization. Also included is a larger field 1205 for the text of the customization itself. As discussed above, the customization in this example is computer code written in a language such as C++, Java, or Python, or a series of scripting commands. The customization can be drafted directly in the customization field 1205, copied from another software application (such as, for example, MS Notepad), or opened from a file by clicking the "OPEN" button 1207. The software interface of FIG. 12 provides compiler functionality for customizations drafted using a computer code that requires compilation. After drafting the customization, the user clicks the "COMPILE" button 1209. The software application then checks for errors and creates executable object code. After finishing, the user presses the "SAVE" button 1211 to save the customization.

As discussed above, it is also possible to create a customization directly through the terminal user interface 200. When the customization is created in this way, it is sent to the host server 715 and the customization assignment information is updated at the same time as a database synchronization. In this example, a customization created through a terminal user interface 200 is assigned by default only to the terminal on which it was created. The customization can then be assigned to additional terminals through the host server user interface or through the administrative functions available through the terminal as discussed in detail below.

In some cases, it is possible to distribute and install a new customization on a terminal 100 without rebooting the terminal 100. In such cases, new and updated customizations are sent between the host 715 and the terminal 100 at the same time as a database synchronization. However, in some cases, the customization, like software updates, requires the terminal 100 to restart. In these cases, the customization is distributed only at system start-up in the same way as discussed above in the discussion of FIG. 9.

In some constructions of the networked time and attendance system 700, each terminal is configured to support only one customization at a time. However, the networked system 700 as a whole can support several customizations. For example, in a large factory environment, terminals located in the factory warehouse require functionality that tracks and displays forklift licensing information. However, terminals located in the factory's sales office do not need such functionality. Therefore, the software application running through the host-server user interface is used to assign the forklift specific customization to all of the terminals located in warehouse areas of the factory and different customizations to other terminals.

In other embodiments, a terminal 100 is configured to store several customizations locally and run a particular customization based upon the type of user. Continuing the large factory example discussed above, if the terminal 100 recognizes that an input employee ID number belongs to a forklift operator, the terminal 100 runs the forklift customization. If, however, the terminal 100 recognizes that the employee identification number belongs to a sales person, the terminal 100 runs a customization associated with the sales department. In such constructions, the customizations are assigned to particular users rather than to particular terminals.

The terminal 100 is also configured to allow employees access to certain functionalities depending upon a previously set authority level. The authority level is defined and edited, for example, by a system administrator while creating the user through the host server user interface. The various authority levels allow access to different functionalities of the customization or the terminal software. For example, a system administrator is granted access to all terminal service menus, terminal/user setup menus, employee management menus, enrollment menus, and system security menus. A department manager, however, might only have access to the employee management menu. A system technician might only have access to the terminal service menu, the terminal/user setup menu, and the system security menu. A standard employee might not have access to any of these menus.

One administrative functionality available only to certain authority levels is the "sync now" option. In much the same way that a full or partial synchronization is initiated on demand through the host server user interface, the terminal 100 is configured to initiate an unscheduled full or partial synchronization at the command of a terminal user with an appropriate authority level. The "sync now" option allows a terminal user to send changes to database contents, user profiles, or the customization directly to the global database 507 without waiting for the next scheduled synchronization. In some embodiments, the "sync now" option is configured to supersede connection requests from all other terminals and to immediately connect with the host server 715.

Figure 13:
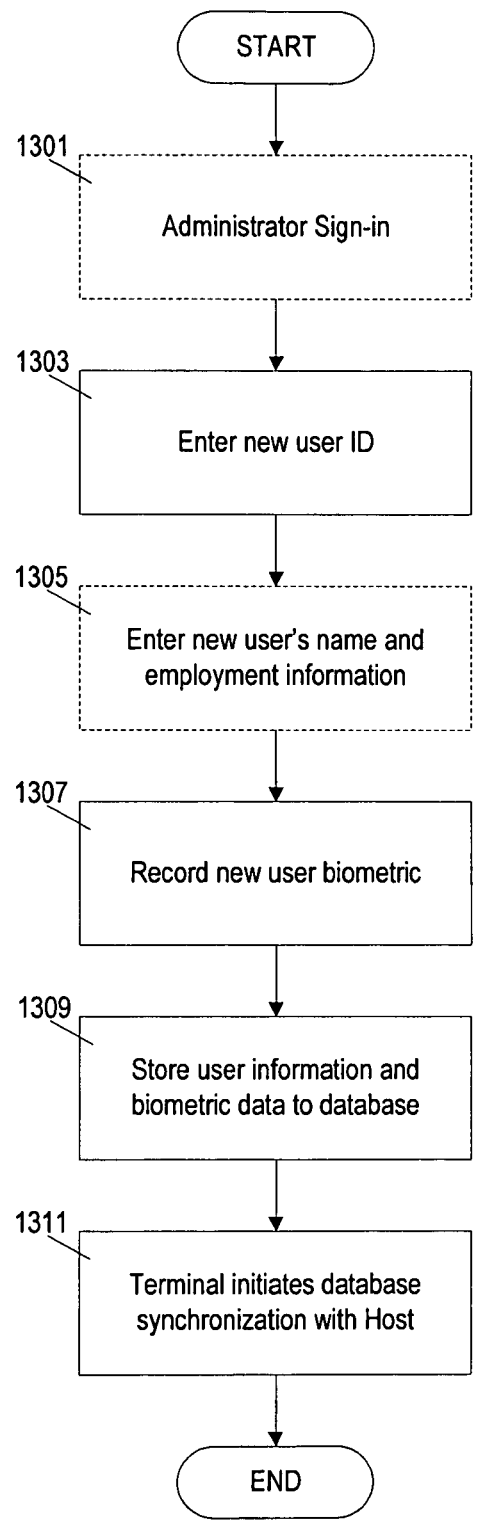
FIG. 13 is a flowchart of the operations performed with and by a terminal while adding a new employee to the networked time and attendance system shown in FIG. 7.

FIG. 13 illustrates another administrative functionality supported by the terminal—the ability to create new stored biometric templates. A system administrator or manager begins by signing into the terminal 100 to access the administrative functionalities (step 1301). The system administrator then inputs a user ID or employee number for the new user (step 1303). If no personal information has yet been entered for the user, a prompt for such information is generated and the information (e.g., the user's full name and employment information) is entered using the alphanumeric keypad 221 on the user interface panel 200 (step 1305). The terminal 100 then creates the new user biometric template (step 1307). This is performed as illustrated in FIG. 6. Once the biometric template is successfully created, the biometric template and new user information are stored to the terminal's local database 505 (step 1309). The next time that the terminal 100 performs a database synchronization, the new user information is relayed through the host server global database 507 to each local database 505 on the other connected terminals (step 1311). As discussed above, some embodiments of the terminal 100 will attempt to initiate a full or partial synchronization immediately after the local database 505 is modified (such as when a new user is added).

As discussed above, the indicator LED 223 located on the user interface panel 200 of the terminal 100 (FIG. 2) is configured to provide quick reference information regarding the status of the biometric capture unit. When the biometric processor 503 is ready for the user's hand to be placed on the biometric data acquisition platen 300, the indicator LED 223 slowly blinks in an amber color. When an image of the user's hand has been successfully captured, the indicator LED 223 shows a steady purple color. If the image capture is unsuccessful or if the user's hand placement is incorrect, the indicator LED 223 will blink red. Similarly, instructions and indications are provided to the user through textual instructions on the terminal's graphical display 201 and the series of small LEDs 227 incorporated into the graphical hand placement instruction component 225 on the user interface panel 200 of the terminal 100.

The general method outlined in FIG. 13 can be modified for other situations. As discussed above, the software application running through the host server user interface is configured to allow for the creation and editing of users. As such, a system administrator can create an employee identification number and enter all of the necessary employee information through the host server user interface without necessarily requiring the presence of the new user. Then, when the new employee begins his first day of employment, the manager or system administrator can perform the method illustrated in FIG. 13, but can omit the step requiring the input of employee data (step 1305). Alternatively, the new user can be given his employee identification number and the terminal 100 can be configured to create and store a new biometric template when the new employee attempts to punch in for the first time without the need for an administrator log-in (step 1301).

As discussed above in reference to FIG. 4, the employee's hand geometry may change over time. The same general method of FIG. 13 can be used to create an updated stored biometric template. With the assistance of a system administrator, the user may enter his employee identification number (step 1303), record a new biometric template (step 1307), and store the new biometric template to the local database 505 (step 1309) from which it is relayed through the global database 507 to the other connected terminals during subsequent synchronization operations (step 1311).

The embodiments described above provide methods and systems for a partial and a full synchronization between a host server and one or more client terminals using database replication techniques. However, some embodiments of the invention include a two-phase synchronization process that synchronizes a plurality of device terminals with a network services server while allowing the terminals to accept and process user transactions semi-autonomously. Some of the concepts and examples described below can be incorporated with the examples described above where the network services server corresponds to the host server and the device terminals correspond to the client terminals described above. During the first phase of the two-phase synchronization process, the terminal adds, edits, or deletes a transaction entry in its local database and sends the new, edited, or deleted transaction object to the network services server for inclusion in the global database. In the second phase, the device terminal synchronizes its local database with the global database stored on the network services server.

Figure 14:
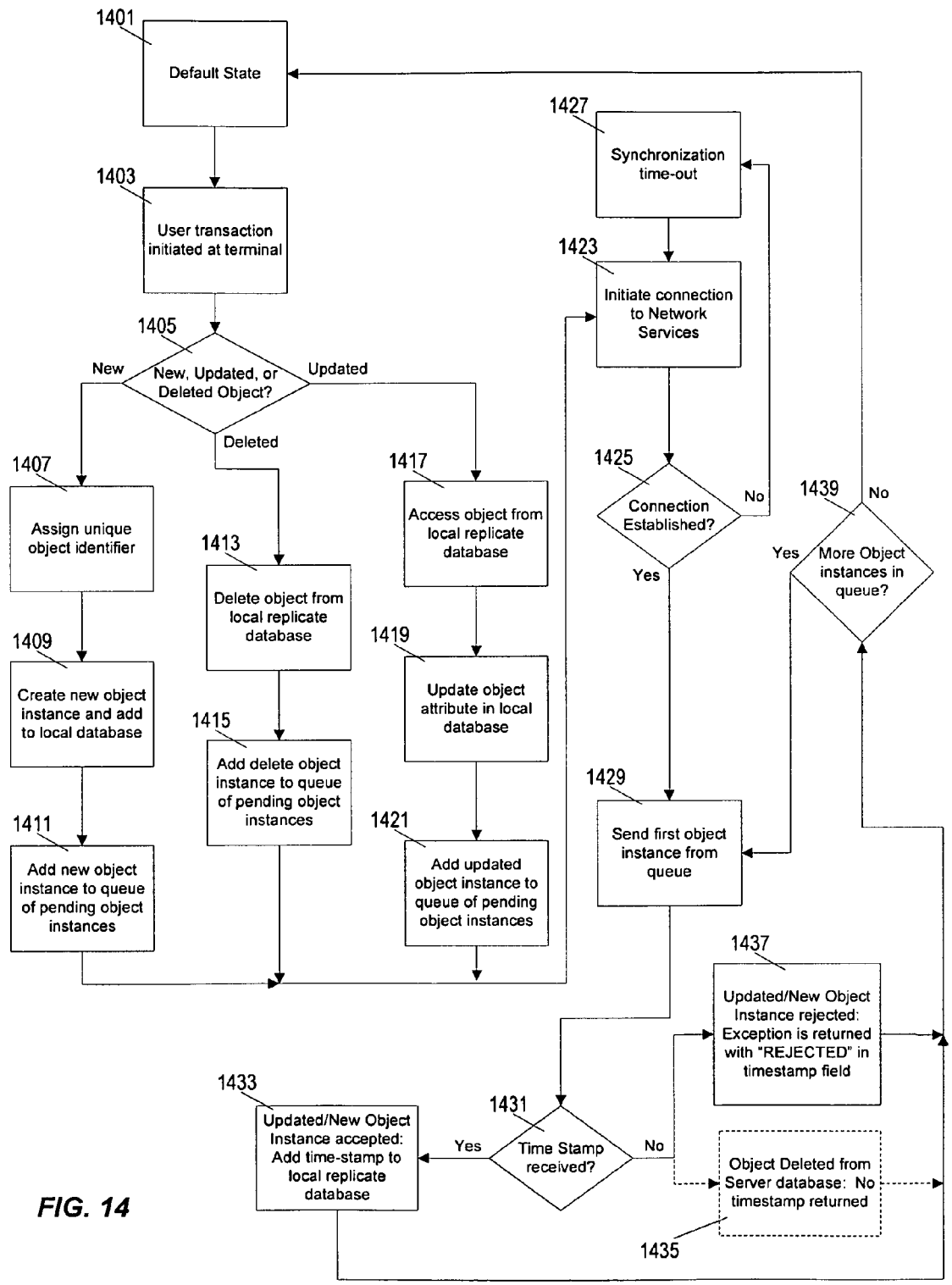
FIG. 14 is a flowchart of the operations performed by the device terminal during the first phase of a two-phase synchronization process.

FIG. 14 shows one embodiment of the first phase synchronization from the perspective of the device terminal. The device terminal begins in a default state (step 1401) where it waits for a new user transaction to be initiated by a user at the device terminal (step 1403). Several different types of transactions can be processed at the device terminal depending upon the intended usage and environment in which the device terminal is being used. The terminal in this example can add new records to the database and can edit or delete existing records (step 1405).

If a new record is being added (e.g., a new user is being created or a new time entry event is being added), the device begins by assigning a unique object identifier to the new entry (step 1407). To ensure that each new object receives a unique object identifier, the network services server assigns a range of object identifiers to each device terminal that is added to the network. When a new object identifier is assigned by the device terminal to a new object, the identifier is removed from the list of object identifiers available for assignment. For example, a terminal may be assigned the range of available object identifiers from 00001 to 50000. The first new user transaction at that terminal will be assigned 00001 as its unique object identifier. If the terminal assigns all of the object identifiers in its predetermined available range, the terminal requests a new range of available object identifiers from the network services server. Because each device terminal is assigned a different range of available object identifiers, an identifier assigned by one device terminal will never conflict with an identifier assigned by another device terminal. After the unique object identifier is assigned, the device terminal creates a new object instances and adds the transaction to the local database (step 1409). The new object instance is then added to a queue of pending object instances (step 1411).

If the user transaction is deleting a database entry, the device terminal first deletes the transaction from the local database (step 1413) and then adds an object instance representing the deletion to the queue of pending object instances. If the user is editing an existing database entry, the device terminal accesses the object from the local database (step 1417), updates one or more object attributes in the local database (step 1419), and then adds an object instance to the queue of pending object instances (step 1421).

After a user transaction has been completed at the device terminal, the device terminal attempts to initiate a connection with the network services server (step 1423). If the connection cannot be established (step 1425), the device waits for a synchronization time-out to expire (step 1427) and again attempts to initiate the connection (step 1423). The first phase synchronization (e.g., steps 1423-1439) occurs in the background. The device terminal can continue to accept and process new user transactions even if the connection with the network services server is unavailable. Such new transactions will be added to the queue (steps 1411, 1415, or 1421) and sent to the network services server once the connection to the network services server is available and established.

After the device terminal establishes a connection with the network services server (step 1425), it sends the first object instance from the queue of pending object instances to the network services server (step 1429) and waits for a response from the server. If the transaction was accepted by the network services server, the device terminal will receive a timestamp from the network services server (step 1431). The timestamp serves as both an indication that the transaction was successfully added to the global database and as an indication of the time that the transaction occurred. If the device terminal receives a timestamp from the network services server, the device terminal adds the time stamp to the object in the local database. As will be described in detail later, the timestamp is later used during the second phase of the two-phase synchronization process. If the new transaction deletes an existing entry from the global database, the device terminal will not receive a timestamp or an error message if the deletion was successful (step 1435).

However, if the network services server determines that there is a conflict between the new transaction and the state of the existing global database, the network services server will not issue a timestamp for the new object. If will instead return an exception with a "REJECTED" error message in the timestamp field (step 1437). The device terminal adds the "REJECTED" message to the timestamp field in the local database to indicate that the transaction was not accepted by the network services server and is not included in the global database. In some embodiments, "REJECTED" database entries are retained by the local database for a predetermined period of time or are moved to a separate database listing. In other embodiments, "REJECTED" database entries are removed from the local database during the next second phase synchronization as described below.

After the object instance is sent to the network services server and the device terminal receives either a timestamp or an error message (step 1433 or 1437), the device terminal checks if there are more object instances in the queue (step 1439). If there are more object instances to be sent to the network services server, the device sends the next object (step 1429) without relinquishing the connection to the network services server. If all of the objects in the queue have been sent to the network services server, the device terminal terminates the connection and returns to its default state (step 1401).

Figure 15:
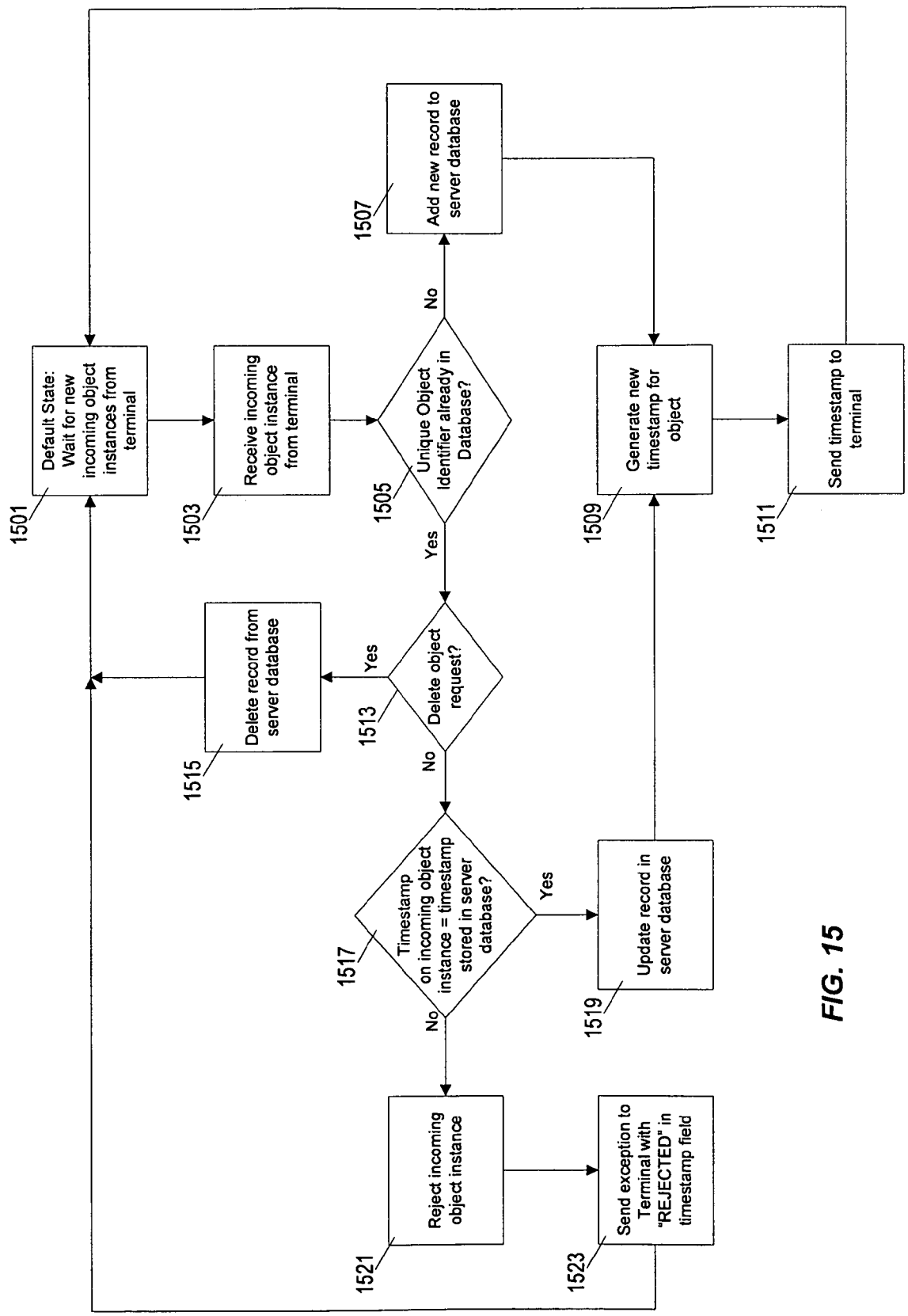
FIG. 15 is a flowchart of the operations performed by the network services server during the first phase of a two-phase synchronization process.

FIG. 15 illustrates the same first phase synchronization as FIG. 14, but from the perspective of the network services server. The network services server begins in a default state (step 1501) and waits for new requests from one of the device terminals connected to the network. When a new object instance is received (step 1503), the network services server checks the global database to see if the unique object identifier assigned to the object instance is already in the global database (step 1505). If not, the network services server determines that the object instances is a new object instance and adds the new record to the global database (step 1507). The network services server then generates a timestamp that is assigned to the new entry in the global database (step 1509), sends a copy of the timestamp back to the device terminal (step 1511), and waits for the next request from a device terminal (step 1501).

However, if the unique object identifier is already in the global database, the network services server determines that the object instance is an edit request, a delete request, or an error. If the object instance is a delete request (step 1513), the network services server deletes the record from the global database (step 1515) and waits for the next request from a device terminal (step 1501).

If the unique object identifier is already in the database, but the received object instance is not a delete request, the network services server compares the timestamp of the received object instance to the timestamp of the corresponding entry in the global database (step 1517). If the timestamps match, then the network services server determines that the edit is being made to a current and valid database entry. The network services server updates the record in the global database (step 1519) and generates a new timestamp for the object entry (step 1509). The previous timestamp in the global database is then replaced by the new timestamp and a copy of the new timestamp is sent to the device terminal (step 1511).

However, if the timestamps do not match (step 1517), the network services server determines that the device terminal is attempting to edit an out-of-date or otherwise invalid object entry. The network services server rejects the incoming object instance and does not edit the entry in the global database (step 1521). The network services server then sends an exception to the device terminal with the "REJECTED" message in the timestamp field (step 1523).

Figure 16:
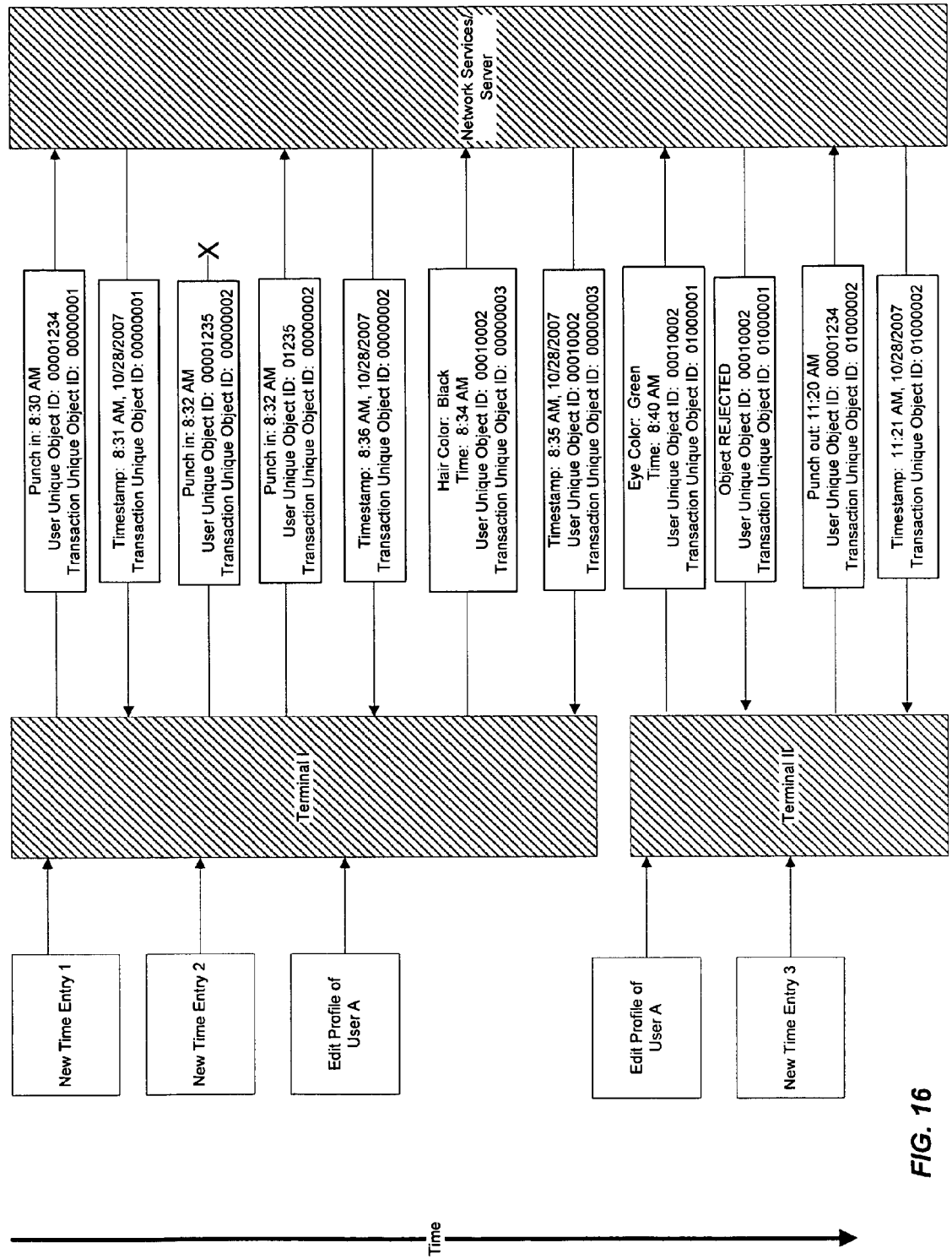
FIG. 16 is an interaction diagram showing an example of the data transferred between two device terminals and a network services server during the first phase of a two-phase synchronization process.

FIG. 16 provides a series of examples to better illustrate the functionality of the first phase synchronization described in FIGS. 14 and 15. At 8:30 AM, a first user punches in using Terminal I (New time entry 1). The transaction is assigned a new object identifier (step 1407, FIG. 14), the entry is added to the local database (step 1409, FIG. 14), and the object instance is sent to the network services server (step 1429, FIG. 14). The network services server receives the object instance (step 1503, FIG. 15), determines that the unique object identifier assigned to the object instance is not yet in the global database (step 1505, FIG. 15), and adds the new record to the global database (step 1507, FIG. 15). The network services server generates a new timestamp (8:31 AM) for the object (step 1509, FIG. 15) and sends the timestamp back to the device terminal (step 1511, FIG. 15).

At 8:32 AM, a second user punches in using Terminal 1 (New Time Entry 2) and the device terminal attempts to send the object instance to the network services server. However, due to heavy network traffic, the device terminal is unable to connect with the network services server. The device terminal waits for the synchronization time-out to expire (step 1427, FIG. 14) and again attempts to initiate a connection with the network services server (step 1423, FIG. 14).

As discussed above in reference to FIG. 14, the device terminal can continue to operate autonomously without waiting for the network services server to respond to a previous object instance. In the example of FIG. 16, a system administrator uses Terminal 1 to change a user attribute for an employee who has recently changed his hair color while the network services server is processing the previous object instance (New Time Entry 2). The device terminal accesses the existing "User" object from the local database (step 1417, FIG. 14), updates the "Hair Color" attribute (step 1419, FIG. 14), and adds the object instance to the queue (step 1421, FIG. 14). When the device terminal receives a timestamp for the second time entry (New Time Entry 2) at 8:36 AM, it then proceeds to send the next item in the queue (steps 1439 and 1429, FIG. 14)—the edited "User" object. The network services server adds the change to the global server (step 1519, FIG. 15) and assigns a new timestamp to the user object (8:35 AM, Oct. 28, 2007).

Shortly after changing the user's hair color on Terminal I, the system administrator realizes that the user's eye color is incorrectly listed on the database. Using Terminal II, the administrator now attempts to change the same user's eye color to "green." However, because the user object was edited on Terminal I and Terminal II has not yet received the updated user object from the network services server through a second phase synchronization, the user object on Terminal II is out of date. Because the timestamp on the global database was changed to this user object when the hair color was edited through Terminal I, the timestamp of the "eye color" object instance does not match the timestamp stored in the local database (step 1517, FIG. 15). The network services server rejects the incoming object instance (step 1521, FIG. 15) and sends an exception message to the device terminal (step 1523, FIG. 15).

In rejecting the object instance when the timestamps do not match, the network services server makes a decision to lose data in order to prevent previously saved data from being overwritten or corrupted. The network services server might also reject an incoming object instance in other situations that create a possibility of corrupted data—for example, if a connected terminal attempts to create a new object with a unique object identifier that is out of the range assigned to the particular terminal. Similarly, the network services server will reject a new, edited, or deleted object instance if it was sent from a terminal that is connected to the network, but has not been registered with the network services server. Unregistered terminals have not been assigned a valid range of available unique object identifiers and, therefore, create a risk of overwriting previously existing data on the global database.

Also illustrated in FIG. 16 is a third time entry. This time the first user is attempting to punch out for lunch using Terminal II. Again, a unique object identifier is assigned to the new transaction event object and the object instance is sent to the network services server, which adds the event object to the global database and returns a timestamp to the device terminal. Although the "punch out" event is recorded and processed as a separate object, distinct from the user's earlier "punch in" record (New Time Entry 1), the second phase synchronization process ensures that each terminal database receives records of transactions conducted at the other terminals connected to the network.

The second phase synchronization process ensures that previous data record created on a device terminal (such as "New Time Entry 1") are available on other device terminals connected to the network. The second phase synchronization involves a full or partial synchronization between the local database on a terminal and the global database on the network services server. Partial synchronizations require less time and computing resources than a full synchronization and, therefore, can be scheduled to occur more frequently. During a partial synchronization, the device terminal receives a subset of records from the network services server that includes all of the records that include a timestamp dated later than the last synchronization performed by the terminal. During a full synchronization, all of the data in the global database is transferred to the device terminal so that the device terminal is able to completely recreate a replicate copy of the global database in the local database.

Figure 17:
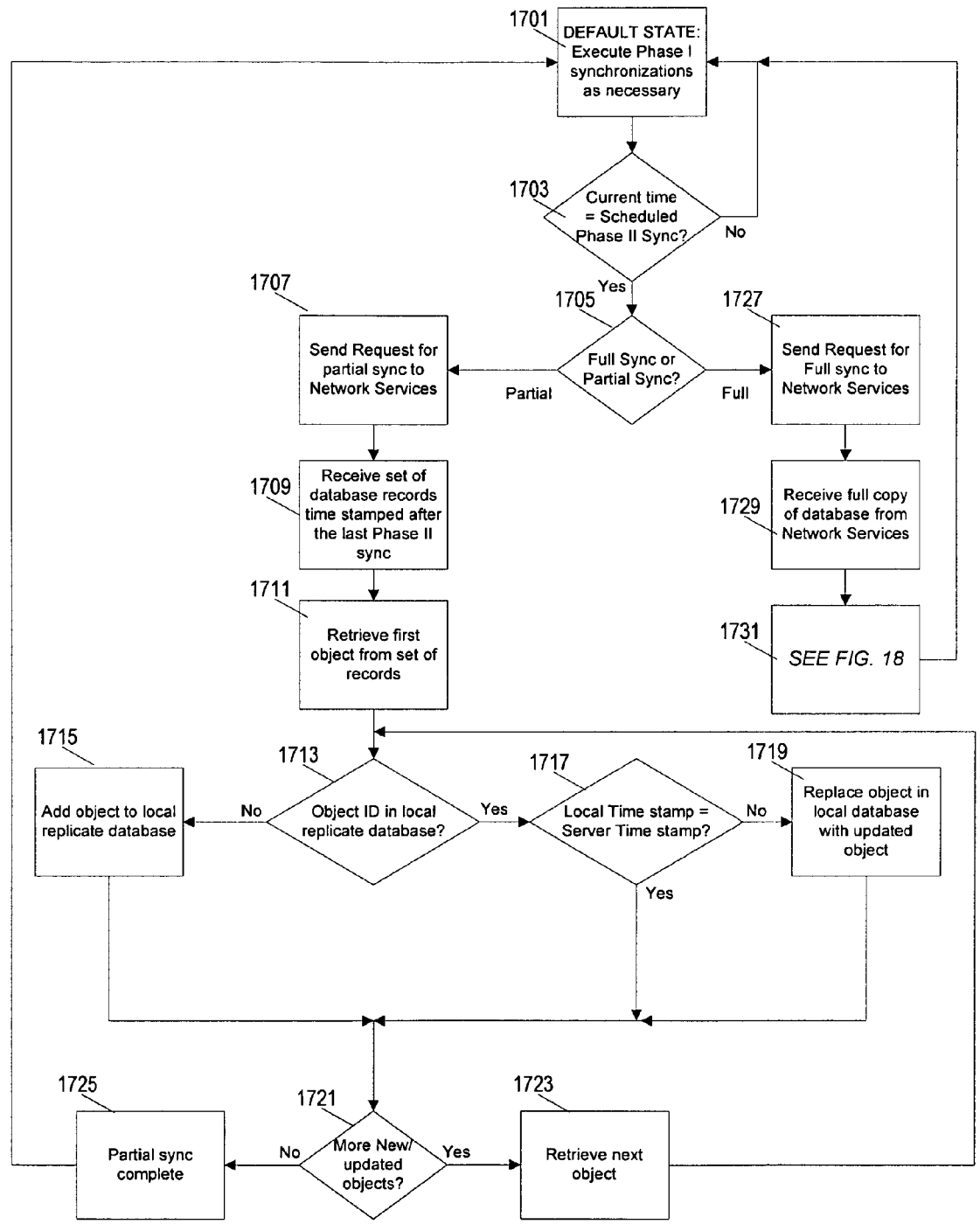
FIG. 17 is a flowchart of the operations performed by the device terminal during the second phase of a two-phase synchronization process.

FIG. 17 illustrates the second phase synchronization from the perspective of a device terminal. As described in FIG. 14, the device terminal begins in a default state where it accepts and processes new transactions as needed (step 1701). The device terminal includes a synchronization schedule that determines when it will initiate a partial second phase synchronization and when it will initiate a full second phase synchronization. When the current time equals the schedule time for a second phase synchronization (step 1703), the device terminal determines whether the synchronization should be a partial or full synchronization based on the data in the synchronization schedule (step 1705).

For a partial synchronization, the device terminal sends a request for a partial synchronization to the network services server (step 1707). The network services server responds by sending the subset of records from the global database that are timestamped after the particular device terminal last requested a second phase synchronization (step 1709). The network services server is able to determine which records have been added or edited since the last second phase synchronization, because the network services server establishes the second phase synchronization schedule for each terminal. The device terminal then retrieves the first object from the received set of records (step 1711) and queries the local database to determine if the unique object identifier is present in the local database (step 1713). If not, the device terminal determines that the object is a new object and adds it to the local database (step 1715). However, if the unique object identifier is already present in the local database, the device terminal determines that the entry is either an updated entry or an entry that was created by that local device terminal. The device terminal compares the timestamp of the object received from the global database to the timestamp of the object in the local database (step 1717). If the timestamps match, the device terminal determines that the local database already includes the most current version of the object. However, if the timestamps do not match, the device terminal replaces the object in the local database with the object from the global database.

After the device terminal has processed an object from the subset of records from the global database, it checks to see if there are any more objects to process (step 1721). If there are more objects, the device terminal retrieves the next object from the subset and repeats the synchronization process (steps 1713, 1715, 1717, and 1719). If there are no more unprocessed objects in the subset, the partial synchronization is complete (step 1725) and the device returns to its default state (step 1701). Although the example illustrated in FIG. 17 iterates through objects in the subset received from the network services server, in other embodiments, the partial second phase synchronization iterates through each object in the local database and searches the subset of objects from the global database for matching unique object identifiers.

Figure 18:
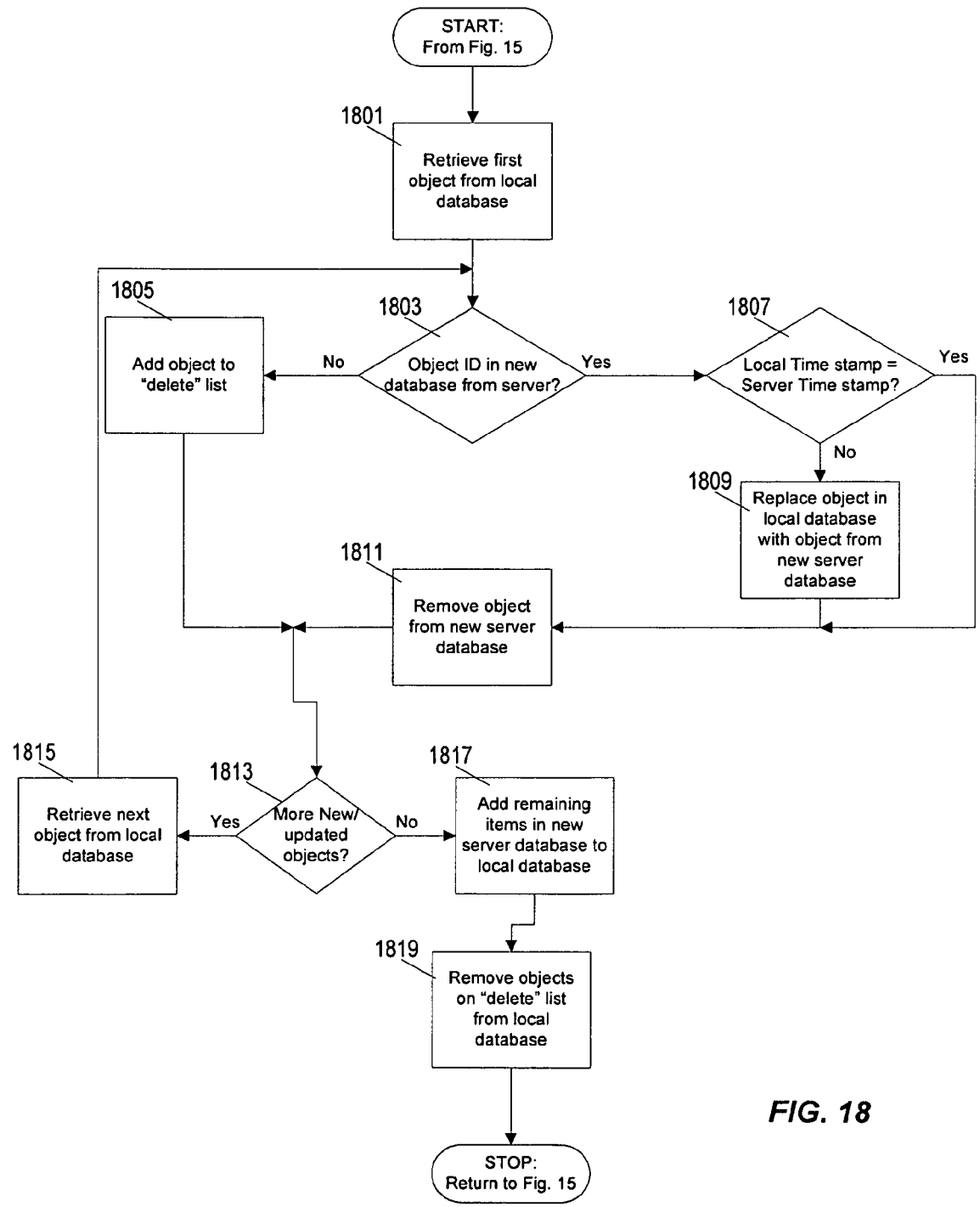
FIG. 18 is a flowchart showing the operations performed by the device terminal during the second phase of a two-phase synchronization process and is a continuation of the flowchart in FIG. 17.

In the case of a full synchronization, the device terminal sends a request for a full synchronization to the network services server (step 1727) and receives a copy of the entire global database (step 1729). FIG. 18 illustrates further details of the full second phase synchronization process (step 1731). The device terminal retrieves the first object from the local database (step 1801) and searches for the unique object identifier in the database provided by the network services server (step 1803). If the unique object identifier is not found in the new global database, then the object has been deleted by another terminal. The device terminal adds that unique object identifier to a "delete list" (step 1805). If the unique object identifier is found in the copy of the global database, the device terminal compares the timestamp of the object in the local database to the timestamp of the object from the global database (step 1807). If the timestamps match, the local database already contains the most current version of the object. However, if the timestamps do not match, the device terminal replaces the object in the local database with the new copy from the global database (step 1809). The object is then removed from the copy of the global database so that it is not processed again by the device terminal during the same full second phase synchronization (step 1811).

After the first object from the local database has been processed, the device terminal checks to see if there are any other objects in the local database that have not yet been processed (step 1813). If so, the device terminal retrieves the next object from the local database (step 1815) and repeats the synchronization process (steps 1803, 1805, 1807,1809, and 1811). When there are no additional unprocessed objects in the local database, the device terminal has compiled a list of all objects to be deleted from the local database and removed all objects from the copy of the global database that were previously included in the local database. Therefore, all of the objects remaining in the copy of the global database are new objects that need to be added to the local database. The device terminal adds these remaining new objects to the local database (step 1817) and deletes all of the objects that are listed in the delete list (step 1819). The full second phase synchronization is now complete and the device terminal returns to the default state (step 1701, FIG. 17).

Although objects to be deleted during the full synchronization are added to a "delete" list and removed from the local database at the end of the full synchronization in the method illustrated in FIG. 18, the device terminal in other embodiments will delete these objects immediately upon determining that they should be deleted (step 1805). Furthermore, in some embodiments, the device terminal verifies that it has completed all first phase synchronizations before initiating a second phase synchronization. Therefore, the second phase synchronization will not be initiated at its scheduled start time if there are one or more objects in the first phase synchronization queue. The second phase synchronization will initiate as soon as the first phase synchronization queue is cleared.

Figure 19:
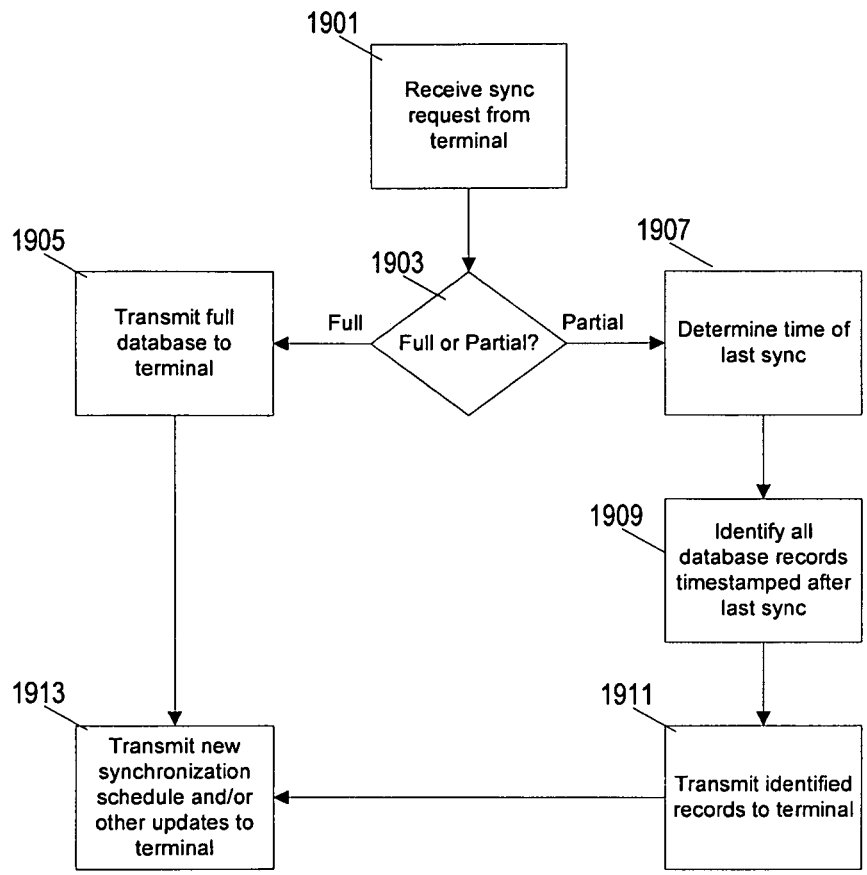
FIG. 19 is a flowchart showing the operations performed by the network services server during the second phase of a two-phase synchronization process.

FIG. 19 illustrates the second phase synchronization process from the perspective of the network services server. The network services server receives a request for a synchronization from one of the device terminals (step 1901) and determines whether the request is for a partial or full synchronization (step 1903). For a full second phase synchronization, the network services server transmits a copy of the entire global database to the device terminal (step 1905). For a partial synchronization, the network services server determines the time of the last second phase synchronization with this particular terminal (step 1907) and identifies all database records that are timestamped after the last second phase synchronization (step 1909). The network services server then transmits this subset of data records to the device terminal (step 1911). Due to the complexity and the high volume of information in the global database, the network services server in this embodiment converts the data to a serialized format that can be reconstructed in database form when received by the device terminal.

In some embodiments, both the partial and full second phase synchronizations can be used to convey additional information other than user transaction records from other terminals. The network services server can also transmit information such as software updates, operations customizations, and new or updated synchronization schedules to the terminals during the second phase synchronization (step 1913). In some embodiments, this information is conveyed separately from the global database records. In other embodiments, this information is incorporated into the global database and, therefore, is conveyed with the serialized global database content.

The particular examples described above represent certain aspects and embodiments of the invention. Other configurations, designs, and uses are possible. For example, certain aspects of the terminals discussed above in reference to a networked embodiment would also be available in a non-networked stand-alone terminal without departing from the intended scope of the invention. Furthermore, although the examples discussed above refer to hand geometry as the biometric used to verify the user's identity, it is possible to apply the concepts of the invention discussed herein to other biometric technologies or other applications that do not include any biometric recognition technology. Finally, although the embodiments of the network communications and synchronization are described above in the context of a time and attendance system, it is possible that the invention can be applied to other applications that include different transactions and are not related to timeclocking. Various features and advantages of the invention are set forth in the following claims.

What is claimed is:

1. A method of synchronizing a local database with a global database in a networked time-keeping environment, the networked time-keeping environment including a server with a computer readable memory that stores the global database and a plurality of client time-keeping terminals each including a computer readable memory storing a local database, wherein the global database and each local database includes a plurality of previously stored data elements and a timestamp corresponding to each previously stored data element, the method comprising:

creating a new data element at a client terminal in response to a time-keeping event at the client terminal, wherein the new data element includes an edited attribute of a previously stored data element and a unique object identifier associated with the previously stored data element;

adding the new data element to the local database of the client terminal;

initiating a connection to the server from the client terminal;

sending the new data element from the client terminal to the server;

sending a previous timestamp associated with the previously stored data element from the client terminal to the server, wherein the previous timestamp was previously received from the server and indicates when the previously stored data element was added to the global database of the server;

if the unique object identifier assigned to the new data element is already stored in the global database,
  comparing the previous timestamp to a timestamp stored in the global database for the previously stored data element, and if the timestamps match,
  changing the previously stored data element in the global database to include the edited attribute,
  generating a new timestamp,
  storing the new timestamp in the global database, and
  sending a copy of the new timestamp to the client terminal;

receiving a timestamp for the new data element from the server indicating when the new data element was added to a global database of the server; and storing the timestamp for the new data element to the local database of the client terminal.

2. The method of claim 1, further comprising creating a second new data element at the client terminal in response to a second time-keeping event at the client terminal, wherein the second new data element does not include an edited attribute of any previously stored data element; selecting a unique object identifier for the new data element from a range of available unique object identifiers assigned to the client terminal by the server; and sending the second new data element from the client terminal to the server.

3. The method of claim 2, further comprising:
receiving the second new data element sent by the client terminal to the server;
determining if the unique object identifier assigned to the second new data element is already stored in the global database; and
if the unique object identifier assigned to the second new data element is not already stored in the global database,
generating a timestamp,
storing the timestamp and the second new data element in the global database, and
sending a copy of the timestamp for the second net data element from the server to the client terminal.

4. The method of claim 1, further comprising sending an exception message from the server to the client terminal if the timestamps do not match, wherein the exception message indicates that the edited attribute was included in a version of the previously stored data element that was not current.

5. The method of claim 1, further comprising:
sending a request for synchronization from the client terminal to the server;
determining the last time that the client terminal sent a request for synchronization; and
receiving a set of data elements from the server, wherein the set of data elements includes all of the data elements stored in the global database that have a timestamp dated later than the last time that the client terminal sent a request for synchronization.

6. The method of claim 5, further comprising
retrieving an element from the set of data elements from the server, and
adding the element to the local database if the unique object identifier associated with the element is not associated with any other element in the local database.

7. The method of claim 5, further comprising
retrieving an element from the set of data elements from the server;
identifying an element stored in the local database that is associated with the same unique object identifier as the element from the set of data elements from the server; and
replacing the element stored in the local database with the element from the set of data elements from the server if the timestamps associated with the two data elements do not match.

8. The method of claim 1, further comprising:
sending a request for synchronization from the client terminal to the server; and
receiving a set of data elements from the server, wherein the set of data elements includes all of the data elements stored in the global database.

9. The method of claim 8, further comprising:
retrieving an element from the set of data elements from the server, and
adding the element to the local database if the unique object identifier associated with the element is not associated with any other element in the local database.

10. The method of claim 8, further comprising:
retrieving an element from the local database;
identifying an element from the set of data elements from the server that is associated with the same unique object identifier as the element from the local database; and
replacing the element stored in the local database with the element from the set of data elements from the server if the timestamps associated with the two data elements do not match.

11. The method of claim 8, further comprising:
retrieving an element from the local database; and
deleting the element from the local database if the set of data elements from the server does not include an element associated with the same unique object identifier as the element from the local database.

12. The method of claim 1, further comprising:
performing a partial synchronization between the client terminal and the server, the partial synchronization including
receiving a set of data elements from the server, wherein the set of data elements includes all of the data elements stored in the global database that have a timestamp dated later than the last time that the client terminal synchronized with the server,
retrieving an first element from the set of data elements from the server,
adding the first element to the local database if the unique object identifier associated with the first element is not associated with any other element in the local database, and
replacing the first element stored in the local database with the first element from the set of data elements from the server if the timestamps associated with the two data elements do not match; and
performing a full synchronization between the client terminal and the server, the full synchronization including
receiving a full set of data elements from the server including all of the data elements stored in the global database,
retrieving a second element from the full set of data elements from the server,
adding the second element to the local database if the unique object identifier associated with the second element is not associated with any other element in the local database, and
replacing the second element stored in the local database with the second element from the set of data elements from the server if the timestamps associated with the two data elements do not match.

13. The method of claim 12, wherein the partial synchronization is performed after adding the new data element to the local database of the client terminal, and further comprising:
receiving a synchronization schedule identifying at least one time at which to perform a full synchronization and wherein the full synchronization is performed at the at least one time.

14. The method of claim 1, wherein the edited attribute of the previously stored data element includes a new clock-out event including a clock-out time, and wherein the previously stored data element includes a previously stored clock-in event including a clock-in time.

15. A method of synchronizing a global database with a plurality of local databases in a networked time-keeping environment, the networked time-keeping environment including a. server with a computer readable memory that stores the global database and a. plurality of client terminals each including a computer readable memory storing a local database, wherein the global database and each local database includes a plurality of previously stored data elements and a timestamp corresponding to each previously stored data element, the method comprising:
receiving a first data element from a first client terminal, the first data element including a timestamp and a first unique object identifier;
determining whether a data element in the global database includes the first unique object identifier;

when a data element in the global database includes the first unique object identifier, comparing the timestamp of the first data element to a timestamp of the data element in the global database;

when the data element in the global database includes the first unique object identifier and the timestamp of the data element in the global database matches the timestamp of the first data element, replacing the data element in the global database with the first data element;

when the data element in the global database includes the first unique object identifier and the time stamps of the data element in the global database matches the timestamp of the first data element, assigning a new timestamp to the first data element stored in the global database, the new timestamp indicating the time that the first data element was added to the global database; and when the data element in the global database includes the first unique object identifier and the timestamp of the data element in the global database does not match the timestamp of the first data element, sending an exception message from the server to the client terminal indicating that the first data element is an edited version of an obsolete data element.

16. The method of claim 15, further comprising, when no data element in the global database includes the first unique object identifier, adding the first data element to the global database as a new data element.

17. The method of claim 15, further comprising:
determining whether a value is assigned to the timestamp of the first data element;
when no value is assigned to the timestamp of the first data element, adding the first data element to the global database as a new data element; and
when no value is assigned to the timestamp of the first data element, generating a timestamp for the first data element indicating when the new data element was added to the global database.

18. A method of synchronizing a global database with a local database in a networked time-keeping environment, the networked time-keeping environment including a server storing the global database, a first client terminal storing a first local database, and a second client terminal storing a second local database, wherein the global database, the first local database, and the second local database each include a plurality of previously stored data elements, and wherein a timestamp is assigned to each of the previously stored data element, the method comprising:
receiving, by the first client terminal, a first change to a data element at a first time;
storing the first change to the data element in the first database;
receiving, by the second client terminal, a second change to the same data element at a second time, wherein the second time is after the first time;
storing the second change to the data element in the second database;
performing a synchronization between the second client terminal and the server at a third time, wherein the third time is after the first time and after the second time and wherein the synchronization between the second client terminal and the server includes
transmitting the data element including the second change stored in the second local database from the second client terminal to the server,
comparing the timestamp of the data element including the second change from the second client terminal to the data element stored in the global database on the server,
determining that the timestamps match,
replacing the data element stored in the global database with the data element including the second change, and
assigning a new timestamp to the data element including the second change stored in the global database; and
performing a synchronization between the first client terminal and the server at a fourth time, wherein the fourth time is after the first time, after the second time, and after the third time, and wherein the synchronization between the first client terminal and the server includes
transmitting the data element including the first change stored in the first local database from the first client terminal to the server,
comparing the timestamp of the data element including the first change from the first client terminal to the data element including the second change stored in the global database,
determining that the timestamps do not match, and
sending an exception message from the server to the first client, wherein the data element including the first change is not added to the global database when the timestamps do not match.

19. The method of claim 18, wherein the first change to the data element includes adding a clock-out event including a clock-out time, wherein the clock-out time is the first time, wherein the second change is a duplicate clock-out event including a new clock-out time, and wherein the new clock-out time is the second time.

* * * * *